(12) United States Patent
Miftakhutdinov et al.

(10) Patent No.: US 12,468,532 B1
(45) Date of Patent: Nov. 11, 2025

(54) PREFETCHER CIRCUIT WITH DYNAMIC TRIGGER POINT

(71) Applicant: Apple Inc., Cupertino, CA (US)

(72) Inventors: Rustam Miftakhutdinov, Hillsboro, OR (US); Douglas C. Holman, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 63 days.

(21) Appl. No.: 18/525,256

(22) Filed: Nov. 30, 2023

Related U.S. Application Data

(60) Provisional application No. 63/585,850, filed on Sep. 27, 2023.

(51) Int. Cl.
*G06F 9/30* (2018.01)
(52) U.S. Cl.
CPC .............................. *G06F 9/30047* (2013.01)
(58) Field of Classification Search
CPC .................................................. G06F 9/30047
USPC ........................................................ 712/207
See application file for complete search history.

(56) References Cited

U.S. PATENT DOCUMENTS

| | | | | |
|---|---|---|---|---|
| 5,809,566 A * | 9/1998 | Charney | ............... | G06F 9/3802 |
| | | | | 712/237 |
| 6,560,693 B1 * | 5/2003 | Puzak | .................. | G06F 9/3858 |
| | | | | 712/240 |
| 7,457,923 B1 * | 11/2008 | Chou | .................. | G06F 12/0862 |
| | | | | 711/137 |
| 8,146,064 B2 | 3/2012 | Chen et al. | | |
| 9,875,106 B2 | 1/2018 | Godard et al. | | |
| 10,642,618 B1 * | 5/2020 | Hakewill | ............... | G06F 9/3802 |
| 2007/0118696 A1 | 5/2007 | McCauley et al. | | |
| 2017/0031823 A1 * | 2/2017 | Ross | .................. | G06F 12/0862 |

* cited by examiner

*Primary Examiner* — Chun Kuan Lee
(74) *Attorney, Agent, or Firm* — Kowert, Hood, Munyon, Rankin & Goetzel, P.C.; Dean M. Munyon

(57) ABSTRACT

A prefetcher circuit with dynamic, root function-based trigger point selection is disclosed. A processor includes an instruction cache and a call stack having entries that store indications of functions called in an instruction stream. A prefetcher is configured to, in response to detection of an instruction cache miss, determine, based on entries in the call stack, a depth of a deepest function of the sequence of functions that remains in the call stack over an interval preceding the instruction cache miss. The prefetcher is further configured to select a trigger point based on the determined depth, and select a training signature based on the selected trigger point. In response to subsequently detecting the training signature, the prefetcher is configured to generate a prefetch request to prefetch instructions into the instruction cache.

20 Claims, 14 Drawing Sheets

PREFETCHER CIRCUIT WITH DYNAMIC TRIGGER POINT

PRIORITY CLAIM

The present application claims priority to U.S. Provisional App. No. 63/585,850 entitled "Prefetcher Circuit with Dynamic Trigger Point," filed Sep. 27, 2023, the disclosure of which is incorporated by reference herein in its entirety.

BACKGROUND

Technical Field

This disclosure is directed to processor circuits, and more particularly, to prefetchers used to speculatively prefetch information from a system memory.

Description of the Related Art

Prefetchers are important components utilized in modern microprocessors to enhance performance. In particular, prefetchers are used to predict data and instructions to be used and, based on these predictions, perform speculative fetches of the data and/or instructions and store it into a cache memory closer to the execution units (both in terms of physical distance as well as access latency). The fetching of these data/instructions occurs before any explicit request from an execution unit, hence their speculative nature and the name "prefetch." Many prefetchers exploit temporal and spatial locality of data and/or instructions to proactively fetch information that is likely to be needed in the near future during execution of a program. When prefetched data and/or instructions are used by the execution unit(s) of a processor, performance is improved, as stalls that occur in accessing data/instructions are prevented.

SUMMARY

A prefetcher circuit with dynamic, root function-based trigger point selection is disclosed. In one embodiment, a processor circuit is configured to execute an instruction stream. The processor circuit includes an instruction cache and a call stack having entries configured to store an indication of functions that are called within the instruction stream. The processor circuit further includes a correlation prefetcher circuit configured to, in response to detection of an instruction cache miss at a particular point in the instruction stream, determine a depth of a deepest function of the sequence of functions that remains in the call stack over an interval preceding the instruction cache miss, the depth being measured based on a position of entries stored in the call stack. The correlation prefetcher circuit is further configured to select a trigger point based on the determined depth, and select a training signature based on the selected trigger point. In response to subsequently detecting the training signature, the correlation prefetcher circuit is configured to generate a prefetch request to prefetch instructions into the instruction cache.

BRIEF DESCRIPTION OF THE DRAWINGS

The following detailed description makes reference to the accompanying drawings, which are now briefly described.

DETAILED DESCRIPTION OF EMBODIMENTS

Figure 1:
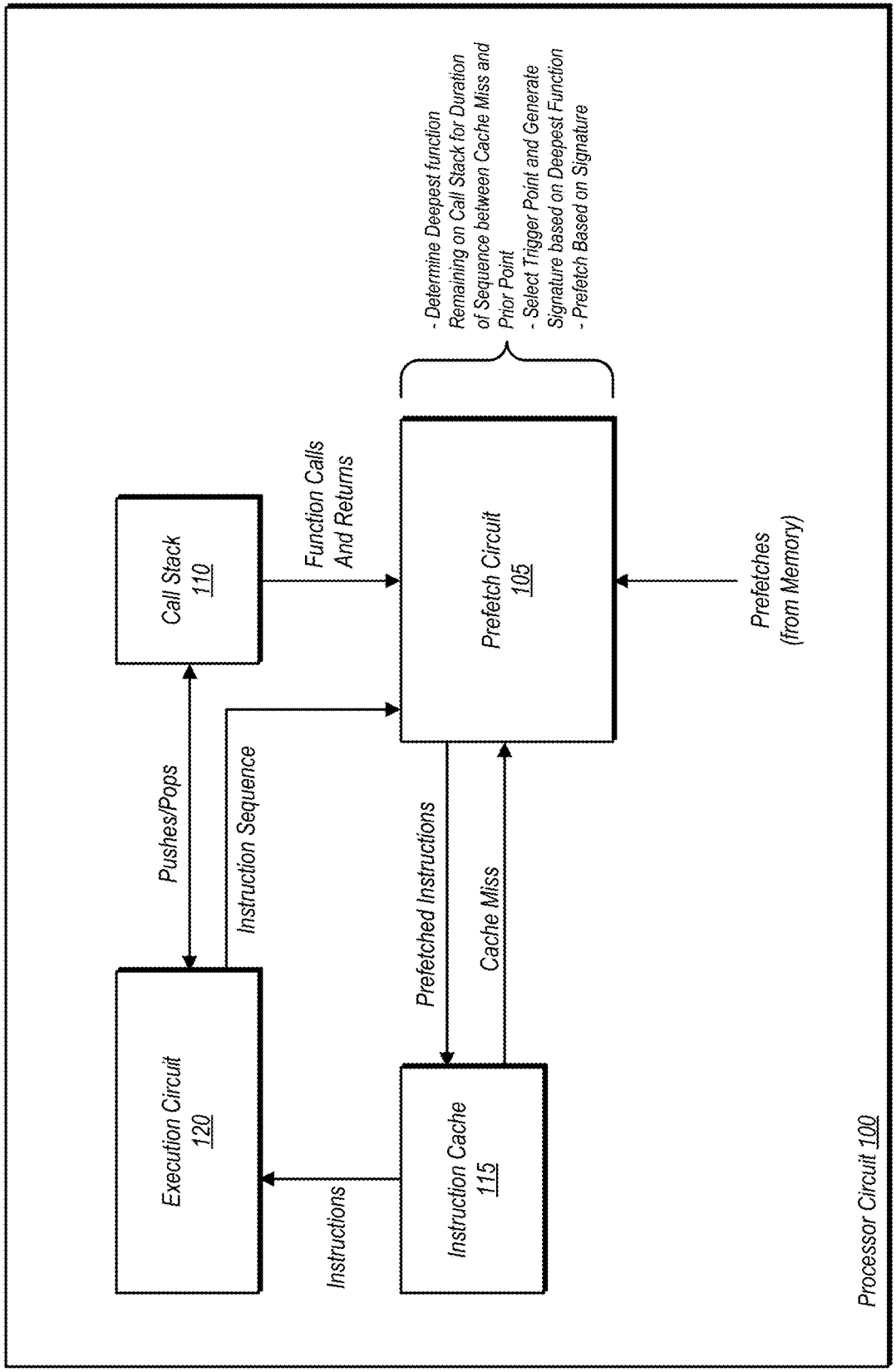
FIG. 1 is a block diagram of one embodiment of a processor circuit including a prefetch circuit.

Hardware prefetchers improve processor performance by pre-fetching information into a cache before it's needed, thereby reducing the time the processor stalls waiting for cache misses to be resolved. A particular kind of hardware prefetcher, the correlation prefetcher, works by associating a cache miss address with a signature (a function of CPU state) observed at a trigger point earlier in program order. When the signature is observed again, the correlation prefetcher generates a prefetch request for the associated address.

In some prefetchers, the trigger point is chosen without regard to the functional organization of the code being executed. Instead, the trigger point is chosen statically. The present disclosure seeks to allow for the trigger point to be chosen dynamically, using the new concept of root function to exploit the functional organization of the code. The new dynamic trigger point selection may result in improved performance of the correlation prefetcher.

A correlation prefetcher associates a cache miss address with a signature observed at a trigger point earlier in program order. The correlation prefetcher is so named because it exploits the temporal correlation between the signature and the address of an access in the near future. As a concrete example, consider a correlation prefetcher for the instruction cache that exploits temporal correlation within the dynamic instruction stream. Whenever an instruction cache miss occurs, the prefetcher picks a trigger point a certain training distance before the miss in the instruction stream. The distance may correspond to a cache refill time. The prefetcher then associates the address of the miss with the signature at the trigger point (such as a hash of the program counter, or PC, of the instruction at the trigger point). That is, the prefetcher stores the address of the miss in a memory array indexed and tagged by the signature.

In prefetchers such as those discussed above, the baseline trigger point is chosen solely based on its distance from the cache miss to ensure that on a future signature hit, the ensuing prefetch would be timely (e.g., it would be at least equal to a typical cache refill time). Thus, the baseline trigger point may happen to land in any function on the call stack. Two potential problems may arise when the trigger point is chosen without regard to the functional organization of the code.

The first problem arises from the fact that functions may be called from many call sites. If the correlation prefetcher is trained using a baseline trigger point that happens to fall into a function invoked from many call sites, it may generate useless prefetches whenever that function is invoked from call sites other than the one observed during training.

The second problem arises from the fact that code paths through a function are not always stable. For example, a particular function may or may not be invoked on the code path leading up to the cache miss. Accordingly, a correlation prefetcher trained using the baseline trigger point that happens to fall into that function may fail to generate a prefetch request if the processor follows a code path that does not invoke that function. The missed prefetch opportunity will cause the processor to stall on the cache miss, reducing performance.

The present disclosure makes use of the insight that the prefetcher does not have to use the baseline trigger point for training. An earlier point in the instruction stream could be used (trigger points after the baseline trigger point may cause late prefetch requests and are not used in the prefetcher of the present disclosure).

Accordingly, the present disclosure contemplates a correlation prefetcher that may select the trigger point (and thus, a training signature) using function-aware dynamic trigger point selection. Instead of using the baseline trigger point, an earlier trigger point may be selected based on function calls. The concept of a root function is introduced, with the root function being defined as the deepest function on the call stack that remains on the call stack for the duration of execution of all instructions between the two points. A signature stack is implemented in hardware to store a signature (e.g., a hash of various information, such as the program counter of the call instruction with other information), and is maintained in the similar manner (pushed and popped) as the call stack. A root function offset detector implements logic to determine the offset between the baseline signature (signature at the baseline trigger point) and the root function (if zero, the baseline trigger point is used, as it corresponds to the root function). Separate root function determinations are made between the baseline trigger point and a retire point (baseline-to-retired root function depth), and the retire point and a point in the instruction stream where the cache miss occurred (retire-to-miss root function depth). The root function used to determine the training signature is then selected based on the shallowest function of the two root function determinations (baseline-to-retire, and retire-to-miss). The function depth at the baseline trigger point is also checked to determine if the baseline trigger point falls within the root function. In cases in which the baseline trigger point is not within the root function, the selected training signature may correspond to an earlier (preceding the baseline trigger point) call instruction, either in the root function itself or in the function from which it was called.

Using the hardware of the present disclosure, the trigger point can be dynamically determined based on a root function rather than statically determined based on some distance between a baseline signature and a prior cache miss. This may reduce the accuracy and coverage problems discussed above, thereby optimizing prefetches. In particular, the number of prefetches that fetch information that is never used may be reduced, while also reducing the number of cache misses that may occur due to not prefetching the correct information.

Various embodiments of a correlation prefetcher in accordance with the disclosure are now discussed in further detail. The description begins with a discussion of a processor circuit that includes an embodiment of a correlation prefetcher of the present disclosure. A diagram illustrating the root function concept and alternate trigger points that may be determined by a correlation prefetcher of the disclosure is then discussed. Block diagrams illustrating various functional circuits of an embodiment of a correlation prefetcher circuit according to the disclosure are then described. Operation of an embodiment of a correlation prefetcher is further illustrated through a series of diagrams of various function call and return sequences. The disclosure further includes flow diagrams directed to methods of operating embodiments of a correlation prefetcher. A block diagram of a processor including a correlation prefetcher is also provided, as well as a device in which such a processor may be implemented. The disclosure also includes a diagram illustrating various applications of a processor that includes an embodiment of the correlation prefetcher. The detailed description concludes with a discussion of a computer readable medium which may be used by a manufacturing system to fabricate a processor that includes a correlation prefetcher of the present disclosure.

Processor with Correlation Prefetcher:

Turning now to FIG. 1, a block diagram of one embodiment of a processor is shown. In the embodiment shown, processor circuit 100 includes a prefetch circuit 105, a call stack 110, an instruction cache 115, and an execution circuit 120. Although not explicitly shown here, processor circuit 100 may include a number of other components, such as a data cache, a lower level unified cache, register files, additional execution circuits, memory controllers, and so on.

In the embodiment shown, execution circuit 120 may include one or more execution units configured to execute various types of instructions. The instructions may be received from, among other places, an instruction cache 115, where instructions may be stored for quick access by execution circuit 120, in lieu of accessing them from memory (which has a significantly greater access latency). In anticipation of instructions to be executed, prefetch circuit 105 may prefetch instructions and store them into instruction cache 115.

The instructions may be executed in sequences, and these sequences may include a number of different function calls and returns. When a function is called in an instruction sequence, its corresponding program counter value (the memory address of the instruction) is pushed onto the call stack 110. Call stack 110 in the embodiment shown includes a number of entries. In one embodiment, call stack 110 may be implemented in hardware, although embodiments in which call stack 110 is a data structure maintained by software are also possible and contemplated. When a return from a particular function is executed, its program value is evicted, or popped, from the stack. Depending on the particular sequence of instructions in execution, the call stack may store program values for a number of different function calls, each of which is pushed onto the stack and may be popped from the stack when it executes a return to another function from which it was called. A given program counter value may be pushed further down in the stack if its corresponding function executes a call to another function. This can repeat a number of times, with additional functions executing their own function calls. Accordingly, a program counter value that has been pushed down in the stack may have to wait for a number of additional functions to execute returns prior to its function executing a return to allow it to be popped from the stack. Execution circuit 120 may provide program counter values to call stack 110 when a function is pushed onto the stack. Similarly call stack 110 may provide program counter values to execution circuit 120 when their corresponding function executes a return to a calling function. Additionally, information regarding function calls and returns may be provided from call stack 110 to prefetch circuit 105.

Prefetch circuit 105 in the embodiment shown is a correlation prefetcher, which triggers a prefetch when certain signatures, sometimes referred to as training signatures, are encountered in an instruction stream. A given signature that triggers a prefetch may be determined based on a cache miss in the instruction cache, as well as a sequence of function calls and returns that preceded the cache miss. Whereas previous correlation prefetchers use a static, baseline trigger point based on a signature encountered some distance prior to the cache miss (e.g., corresponding to a cache refill time), prefetch circuit 105 in the embodiment shown is configured to dynamically determine the trigger point, and thus a training signature that triggers prefetches, based on the sequence of function calls and returns in an instruction stream leading up to the cache miss.

In determining the trigger point, and thus the training signature, prefetch circuit 105 may determine a root function between some prior point in the instruction stream and the point of the cache miss. As defined herein, the root function between any two points is the deepest function that remains on the call stack for the entirety of the duration between those two points. Other function calls may be executed between those two points, although their respective program counter values will be popped from call stack 110 prior to reaching the end point or pushed to the call stack after the beginning point. In contrast, the program counter value for the root function will remain in the call stack for the duration of time between the two points.

In the embodiment shown, prefetch circuit 105 may use as the two points a baseline trigger point as a beginning point, and the cache miss as the end point. The baseline trigger point is a point in the code sequence that is some fixed distance from the cache miss point, with this distance being at least a typical cache refill time in duration. That is, if a prefetch were triggered at the baseline trigger point, the processor circuit 100 should be able to fetch and load all of the instructions in an amount of time that is no greater than (and possibly less than) the time elapsed between the beginning of the prefetch and a time in which at least one of the prefetched instructions would be requested by execution circuit 120.

Figure 2:
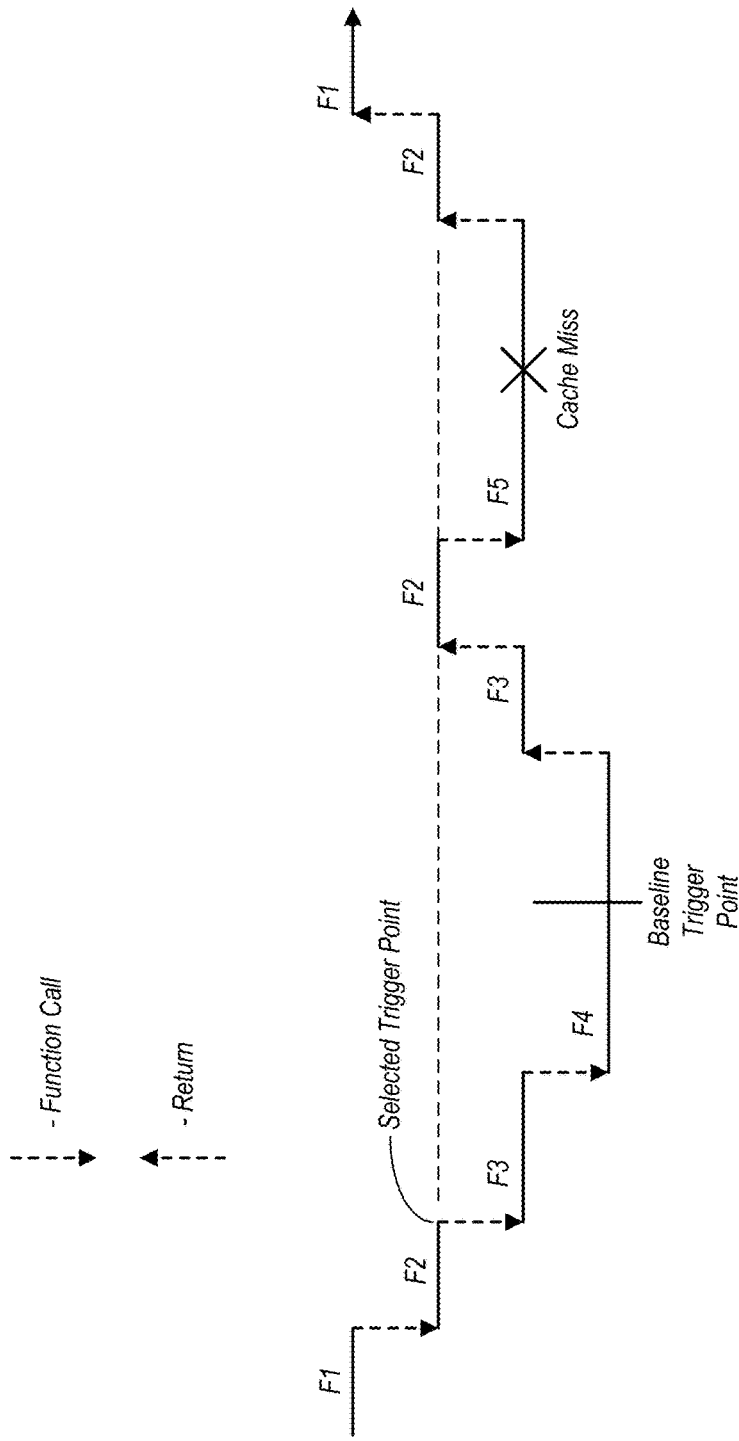
FIG. 2 is a diagram of a sequence of function calls and returns in an instruction stream illustrating alternate trigger points usable by one embodiment of a prefetch circuit.

When a cache miss occurs in instruction cache 115, prefetch circuit 105 picks the appropriate trigger point in the recent instruction stream based on recently observed function calls and returns. Prefetch circuit 105 associates the training signature sampled at that trigger point with the address of the cache miss. If the training signature is subsequently encountered, a prefetch is triggered, eliminating or reducing the latency of the cache miss. The selected training signature corresponds to a trigger point that occurs at or prior to the baseline trigger point in the code sequence. Root Function and Alternate, Dynamically Selected Trigger Points;

FIG. 2 is a diagram of a sequence of function calls and returns in an instruction stream illustrating the concept of the root function. As noted above, the root function between any two selected points in an instruction stream is the deepest function that remains on the call stack for the duration of the program execution between those two points.

As shown in FIG. 2, a sequence of function calls and returns is carried out. A cache miss occurs during execution of function F5. A baseline trigger point is set in function F4, based on a distance from the cache miss, with the distance corresponding to duration that is at least a typical cache fill time, meaning instructions fetched at the time of the baseline trigger would be stored in the cache and available for use after an amount of time to the cache miss has elapsed.

In the illustrated example, between the Baseline Trigger Point, and Cache Miss, function F1 is a function having a program counter that remains on the call stack for the entirety of this sequence. However, F1 is not the deepest function remaining on the call stack between the Baseline Trigger Point and the Cache Miss. Accordingly, F1 is not the root function in this example. In contrast, between the Baseline Trigger Point and the Cache Miss, F2 is the deepest function that remains on the call stack for this duration, as there are no returns from F2 between Baseline Trigger Point and the Cache Miss (and thus F2 is not popped from the call stack in this interval), while F2 is also deeper in the call stack than F1.

Meanwhile, F4, the function which includes the baseline trigger point is not the root function between the Start Point and the Cache Miss, as a return from F4 occurs during this time, which indicates that its corresponding program counter is popped from the call stack. Similarly, F5, in which the cache miss occurs, is not the root function between the Start Point and the Cache Miss, as there is a call into this function subsequent to the Start Point in the sequence and prior to the Cache Miss. Similarly, F3 is not the root function because it is popped from the call stack prior to reaching the Cache Miss.

In the correlation prefetcher circuit of the present disclosure, any instruction in F2 preceding the baseline trigger point could be selected as the point in the sequence at which, when the corresponding training signature is detected and thus causes a prefetch to be carried out. In this example, the last instruction of F2 prior to entering F3 (as called by F2) is the Trigger Point. However, any earlier instruction in F2 subsequent to the call from F1 and prior to the call to F3 could be used.

The benefit of using a root-function based trigger point (such as the Trigger Point in the example of FIG. 2) rather than using a static baseline trigger point is that accuracy and coverage of prefetches carried out by prefetch circuit 105 may be improved when the baseline trigger point is not in the root function. It is noted that, in instances when the baseline trigger point happens to land in the root function, the signature at the baseline trigger point is used as the training signature. The coverage improvement arises from the fact that there may be multiple dynamic code paths between the root function instruction, which is a call if the baseline trigger point does not land in the root function, and the next instruction of the root function. The baseline trigger point may lie on only a fraction of these code paths; thus, when the other code paths are taken, the correlation prefetcher will not generate the prefetch for potentially needed information, thereby leading to a loss of coverage. The root function instruction may belong to only a fraction of code paths through the root function that lead to the cache miss point. However, all of these paths have to go through the first instruction of the root function. Equivalently, they all have to go through a call whose target is the first instruction of the root function. Thus, a root function call-based trigger point with the latest taken branch target signature would result in the prefetch request on all of these paths, increasing coverage.

The accuracy improvement arises from the fact that code paths that do not go through the root function but do go through the baseline trigger point are unlikely to get to the instruction that caused the training event (the instruction cache miss in case of an instruction cache prefetcher). The reason is that the internal logic of the root function is the source of the causal relationship between the baseline trigger point and the cache miss. Code paths not passing through the root function lack this causal relationship and therefore are unlikely to need the information with which the correlation prefetcher is being trained. Using the root function-based trigger point prevents these code paths from triggering useless prefetches, improving the correlation prefetcher accuracy.

Accordingly, some embodiments of prefetcher circuit 105 of FIG. 1 may store history information regarding previous prefetches to evaluate them in terms of accuracy and coverage. Using this information, trigger points and their corresponding training signatures may be selected to optimize the prefetches to prevent cache misses while attempting to avoid cache pollution that may occur when instructions prefetched into the cache are not used.

Figure 3A:
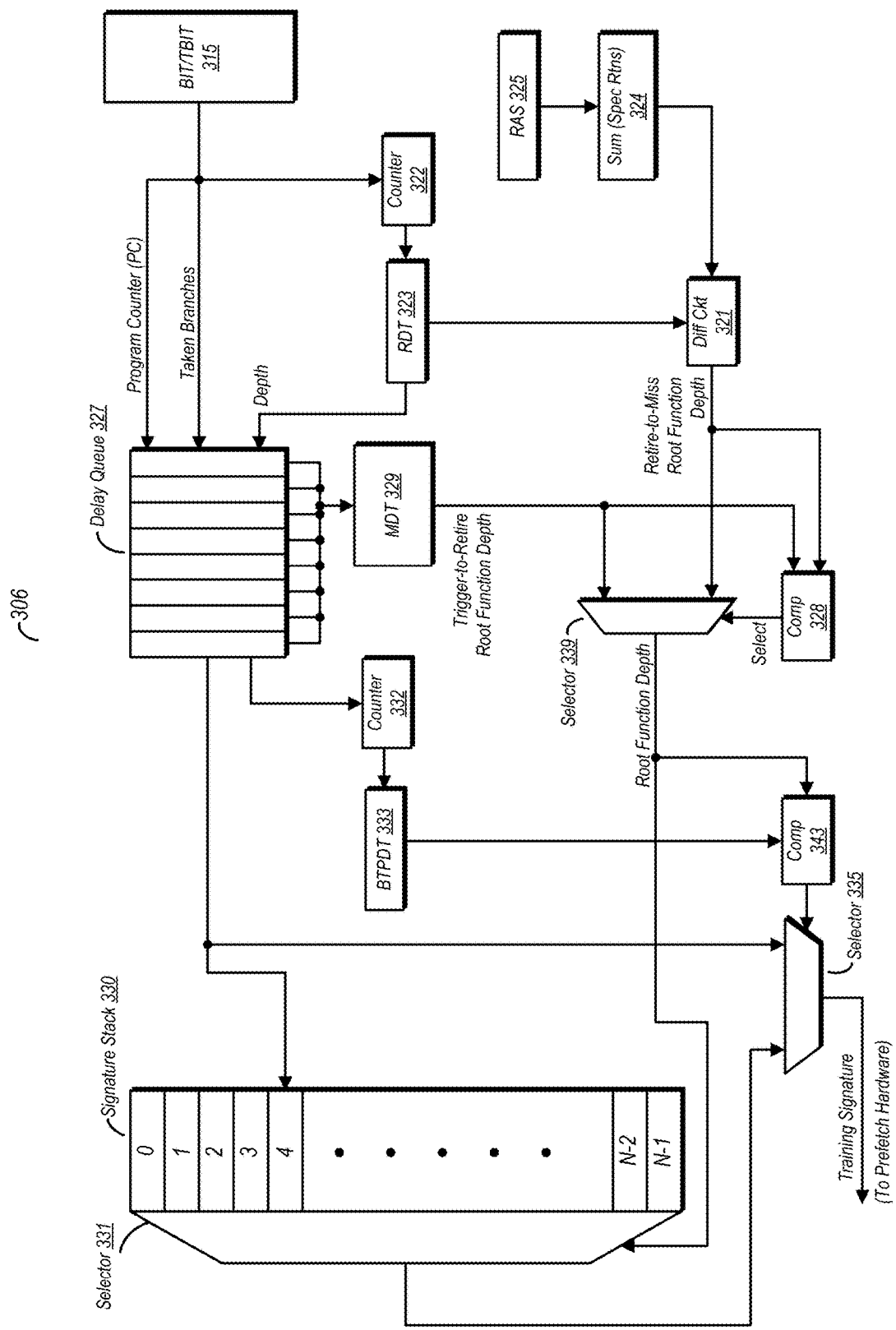
FIG. 3A is a block diagram illustrating one portion of an embodiment of a prefetch circuit usable to determine a training signature.

Prefetcher Hardware:

FIG. 3A is a block diagram illustrating one portion of an embodiment of a prefetch circuit usable to determine a training signature. In the embodiment shown, the signature generator 306 of a correlation prefetcher may determine a root function and generate, based thereon, a training signature used to trigger prefetches. In determining a root function on which to generate a training signature, signature generator is configured to evaluate three different pieces of information: a root function depth between a baseline trigger point and a retire point (baseline-to-retire root function), a root function depth between the retire point and a cache miss point (retire-to-miss root function), and a function depth at a baseline trigger point. Based on comparisons of these values, the training signature associated with the root function-based trigger point is determined.

Signature generator 306 includes a branch instruction table/taken branch instruction table (BIT/TBIT) circuit 315 configured to provide information regarding taken branch instructions, including calls and returns, that have executed and have been retired. Information from BIT/TBIT circuit 315 is provided to a delay queue 327 and to a counter 322. It is noted that in various processor embodiments, BIT/TBIT circuit 315 may be separate from the prefetcher circuit that includes signature generator 306, but is shown here as part of the structure of the latter for the sake of convenience.

Delay queue 327 in the embodiment shown is a first-in, first-out structure that receives the information from taken branches, including calls and returns, corresponding program counter values, and function depth values (depth) from retire depth tracker (RDT) circuit 323, which is updated by counter 322. The information input into delay queue 327 may be a hash of the information received from these various sources, and may thus be a signature that occurs at that particular instruction. The size of delay queue 327 corresponds to at least a typical cache refill time between a baseline trigger point and a cache miss point. The signature in the last entry of delay queue 327 (left side in drawing, next entry to be output) is the signature that corresponds to the baseline trigger point if a cache miss occurs concurrent therewith. When a signature corresponding to a function call is output from delay queue 327, counter 332 may increment, with its count value being provided to baseline trigger point depth tracker circuit (BTPDT) 333. If the signature output from delay queue 327 corresponds to a return, counter 332 is decremented, and the count value is again provided to BTPDT circuit 333. In this manner the function depth of the baseline trigger point is tracked.

Signature generator 306 in the embodiment shown includes a signature stack 330. In the embodiment shown, signature stack 330 is a last-in, first out structure with operation similar to that of a call stack. Signature stack 330 as shown here includes a number of entries N (0 to N−1), each of which stores a signature corresponding to a function call. Thus, if the signature that is output from delay queue 327 corresponds to a particular function call, that signature is pushed onto signature stack 330 in response to a function call. A signature at the top of signature stack 330 that corresponds to a function for which a return is output from delay queue 327 is popped from signature stack 330. More generally, signatures corresponding to function calls are pushed onto the signature stack 330 while signatures corresponding to function returns are popped from the stack. A signature may be pushed further up into signature stack 330 if another function call is carried out before its own corresponding function has executed a return. A signature may move down in signature stack 330 in response to execution of a return by another function corresponding to a signature that is further down in signature stack 330.

In the embodiment of signature generator circuit 306 shown here, retire depth tracker (RDT) circuit 323 is coupled to counter 322, and is configured to track a function depth at a retire point. Counter 322 in the embodiment shown is configured to increment when receiving, from BIT/TBIT circuit 315, an indication of a function call. Counter 322 is further configured to decrement when receiving from BIT/TBIT circuit 315 an indication of a function return. Since the information provided by BIT/TBIT circuit 315 corresponds to function calls and returns that have been retired, the count value from counter 322 provided to RDT circuit 323 tracks a function depth at a current retire point. This function depth is provided from RDT circuit 323 along with the signature for a particular taken branch into delay queue 327.

To compute the retire-to-miss root function depth, a number of speculative returns for retired calls is also needed. Accordingly, return address stack (RAS) circuit 325 provides information regarding a number of function calls that have executed, retired, and had a corresponding function return which has not retired (speculative return). From the definition of root function between two points, it follows that the root function between the retire point and the RAS prediction point (roughly same as instruction cache miss point) is at the target of the deepest retired call in the call stack for which there is not yet a predicted return. Summing circuit 324 accesses RAS circuit 325 to determine the current number of speculative returns for retired calls based on the previously executed and retired function calls. This offset value is provided to difference circuit 321, along with the retire depth value from RDT circuit 323. The difference between these two values (if any), indicates the root function depth between the retire point and the cache miss point. The output of difference circuit 321, a depth indication, is provided to comparator circuit 328, and also to a first input of selector 339. This depth indication corresponds to a call stack depth of the retire-to-miss root function. This offset may also be referred to as the retire-to-miss root function depth.

To determine the baseline trigger-to-retire root function depth, minimum depth tracker circuit 329 is used. In the embodiment shown, minimum depth tracker circuit 329 is coupled to each entry of delay queue 327. Since each of the entries in delay queue 327 corresponds to a retired branch instruction (which can include retired calls and retired returns), and since each includes a depth value (provided by RDT circuit 323), the root function depth between the baseline trigger point and the retire point (in the entry at the right-hand portion of delay queue 327) can be determined based on the minimum depth value of all entries therein. Accordingly, MDT circuit 329 evaluates the depth of all entries in delay queue, and outputs a value that indicates the baseline trigger-to-retire function depth to comparator circuit 328, as well as to a second input of selector 339. This depth indication corresponds to a call stack depth of the baseline trigger-to-retire root function. This offset may also be referred to as the baseline trigger-to-retire root function depth.

Comparator circuit 328 in the embodiment shown is configured to, on a cycle-by-cycle basis, compare the baseline trigger-to-retire root function depth (from MDT circuit 329) to the retire-to-miss root function depth (from difference circuit 321). Based on this comparison, comparator circuit 328 generates a selection signal, Select, which causes the smaller value to be selected. Since the input values to comparator circuit 328 as based on call stack depths relative to a root function in their respective intervals, this selection effectively determines the root function for the entirety of the interval between the baseline trigger point and the cache miss. In some instances, the depth values may be equal. In such instances, the comparator may cause either of the inputs to be selected for output, or may simply maintain a most recent previously selected input as the output, as the respective root functions are the same. The output of selector circuit 339, Root Function Depth, is provided as an input to another comparator circuit 343, as well as a selection input to selector circuit 331.

Selector circuit 331 in the embodiment shown is coupled to signature stack 330. Selector circuit 331 includes a number of inputs N (0 to N-1) each of which corresponds to one of the entries in signature stack 330. In any given cycle, the selected entry corresponds to the root function depth output from selector circuit 339. The selected entry is provided to one input of selector circuit 335. The other input to selector circuit 335 is coupled to the output of delay queue 327, and receives therefrom the signature corresponding to a current baseline trigger point.

Comparator circuit 343 in the embodiment shown is configured to compare the root function depth output from selector circuit 339 (shallower of the trigger-to-retire depth and retire-to-miss depth) with the function depth at the baseline trigger point output from BTPDT 333. Based on this comparison, the final training signature is determined. If the two values are equal, the baseline trigger point falls within the root function. Accordingly, the signature associated with the baseline trigger point is selected as the training signature. However, if the root function depth output from selector circuit 339 is shallower than the function depth at the baseline trigger point, then the signature selected from selector circuit 331 (from signature stack 330) is the training signature.

Figure 3B:
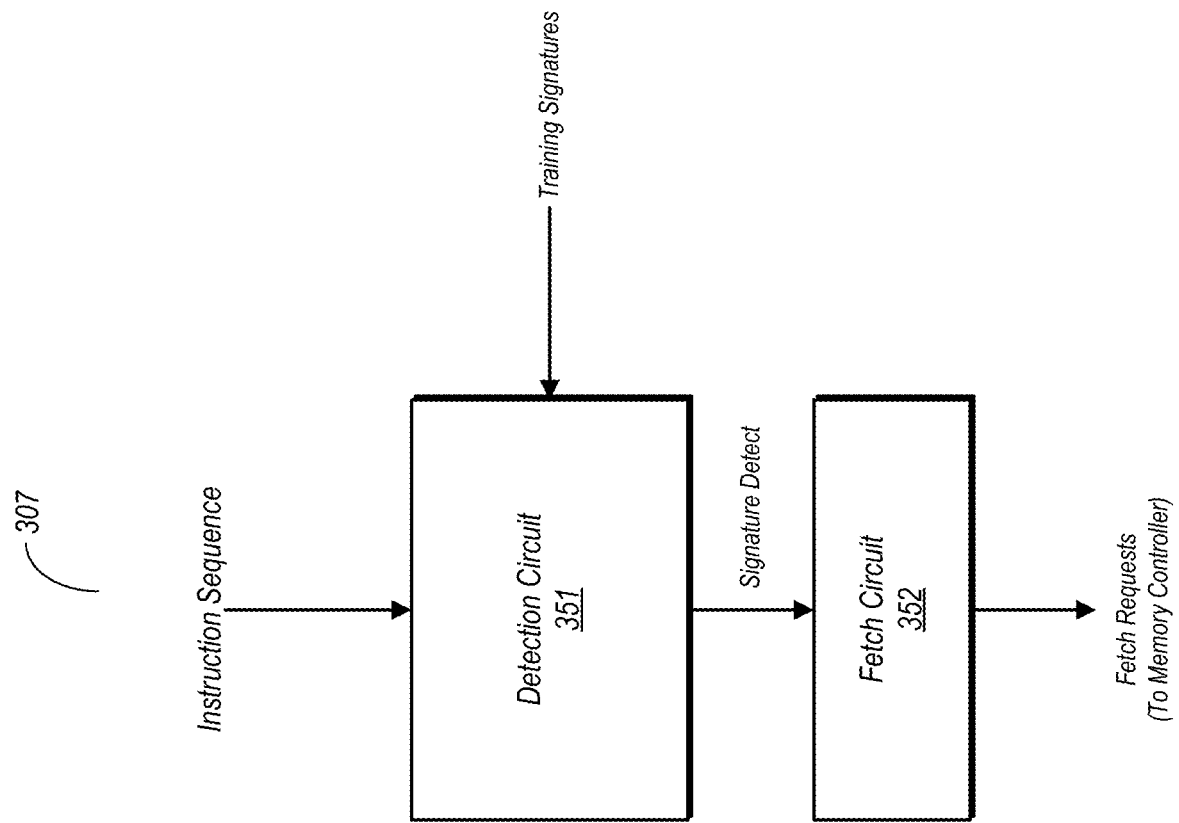
FIG. 3B is a block diagram illustrating another portion of an embodiment of a prefetch circuit usable to detect a training signature in an instruction stream and generate prefetches based thereon.

FIG. 3B illustrates another portion of the hardware used in prefetcher circuit. In the embodiment shown, a second portion 307 of prefetch circuit includes detection circuit 351 and fetch circuit 352. These two circuits operate to detect previously generated signature to trigger a prefetch to prevent a cache miss that occurred when the signature was previously encountered.

Detection circuit 351 is coupled to receive and store training signatures from signature generator 306 and information regarding an executing instruction sequence. Detection circuit 351 monitors the instruction sequence and compares signatures thereof with the training signatures. In response to a detection of a given training signature in the instruction sequence, detection circuit 351, a signature detect signal is asserted. In response to assertion of the signature detect signal, fetch circuit 352 generates memory requests to prefetch the instructions in the sequence associated with the detected training signature.

Figure 4:
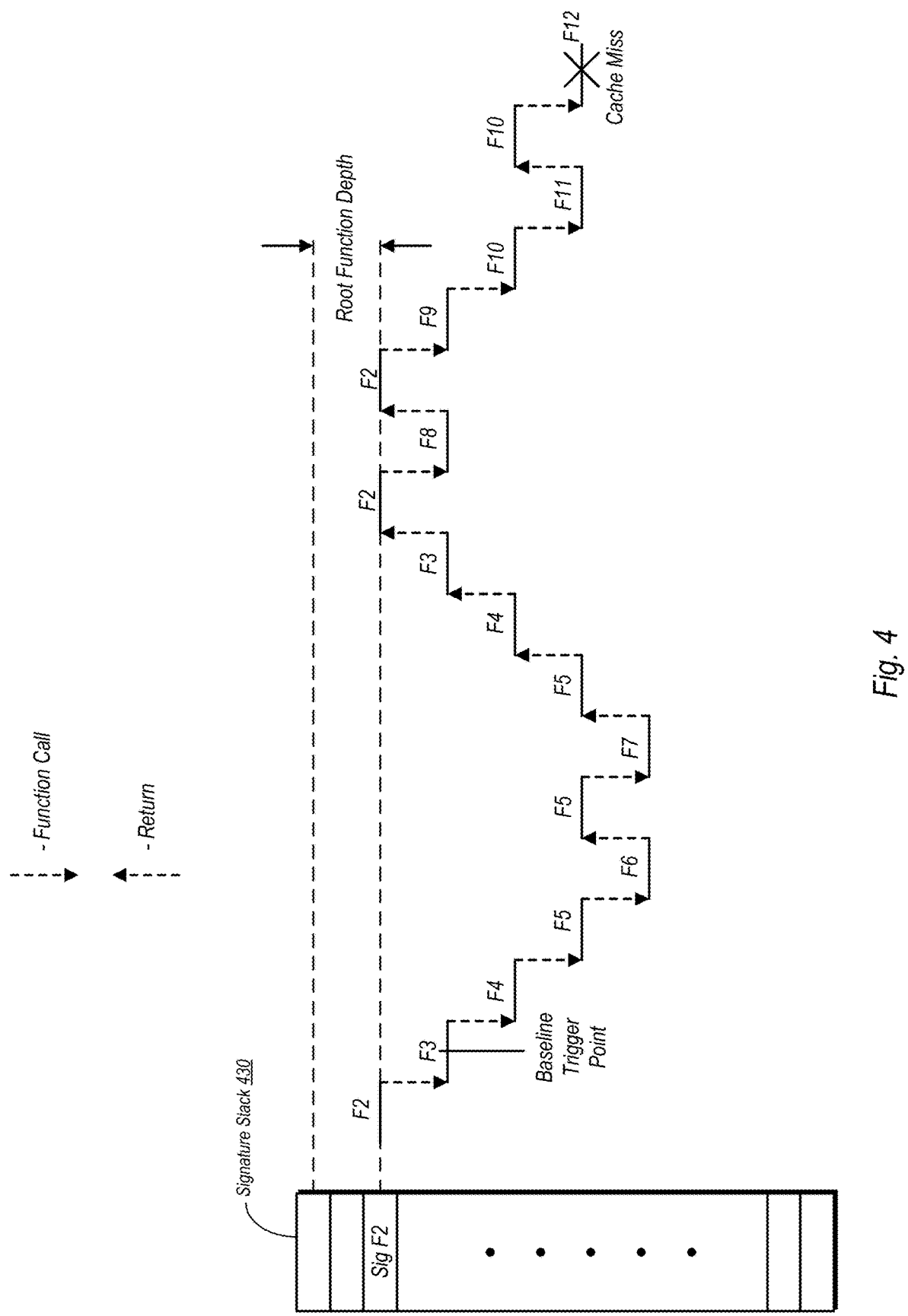
FIG. 4 is a diagram illustrating a root function in a signature stack in a sequence of function calls and returns between a baseline trigger point and a cache miss as determined by one embodiment of a prefetch circuit.

Root Function Examples:

FIG. 4 is a diagram illustrating a root function in a signature stack in a sequence of function calls and returns between a baseline trigger point and a cache miss as determined by one embodiment of a prefetch circuit. In the illustrated example, a function sequence between a baseline trigger point and a cache miss point includes function calls and returns that vary between functions F2 and F12. The baseline trigger point occurs in function F3, while the cache miss occurs in F12.

In this example, F2 is the root function, as it is the deepest function that remains on the signature stack between the baseline trigger point and the cache miss point. F2's corresponding signature is the third function from the top, with signatures for other functions being less recently pushed onto signature stack 430. However, since F2 is the deepest function having a program counter value remaining on the call stack as well as on the signature stack 430, it is thus the root function. In this example sequence, a call to function F2 is made prior to the baseline trigger point. Accordingly, since F2 is the root function, the training signature selected by a prefetcher circuit according to this disclosure may correspond to a trigger point preceding the baseline trigger point at some point within F2.

Figure 5:
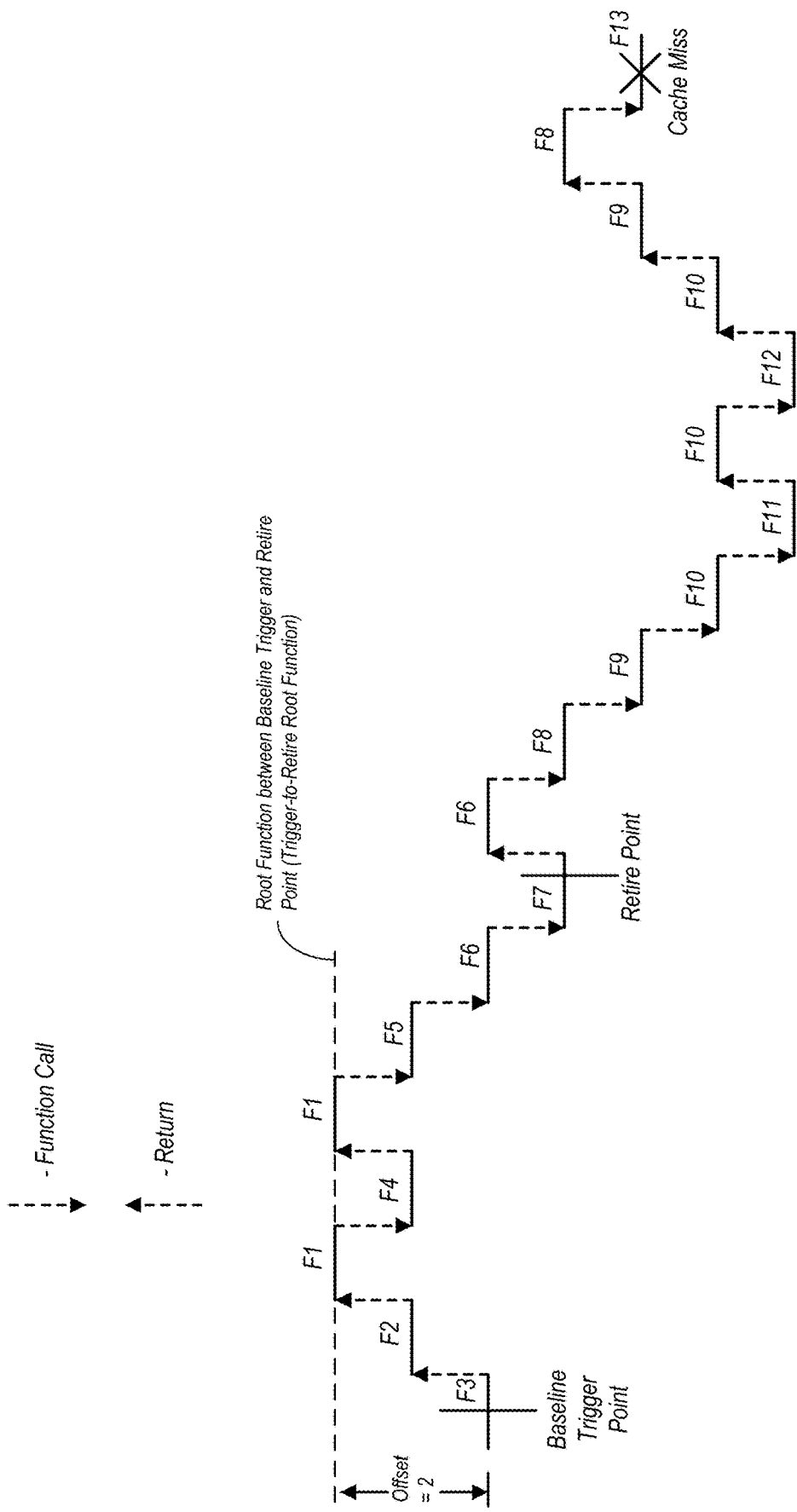
FIG. 5 is a diagram illustrating a root function in a sequence of function calls and returns between a baseline trigger point and a retire point as determined by one embodiment of a prefetch circuit.

FIG. 5 is a diagram illustrating a root function in a sequence of function calls and returns between a baseline trigger point and a retire point as determined by one embodiment of a prefetch circuit. In the example of FIG. 5, the sequence includes functions F1 to F13. The retire point occurs during execution of F7 after a call from F6. At the baseline trigger point, the sequence is in F3, and thus each of F1, F2, and F3 is called at least once prior thereto. F1 is the root function in this example, as there are no returns from F1 to another function from which it was called between the baseline trigger point and the retire point. Accordingly, in this example, the program counter for F1 will remain on the call stack for the entirety of the sequence between the baseline trigger point and the retire point.

Note that in the example of FIG. 5, the retire point occurs in function F7. In this sequence, there is one return to F6 after the retire point, followed by a number of calls to other functions up to F12 and returns up to F8 before the cache miss occurs in F13. The retire-to-miss root function in this case is F6, as it is the deepest function having a program counter that remains on the call stack for the entirety of the interval between the retire point and the cache miss. However, since F1 is the root function between the baseline trigger and retire points and remains on the call stack through the Cache Miss, it is thus the root function for this example, and thus the comparator 328 of FIG. 3A would cause selector 339 to select the trigger-to-retire root function depth output from MDT 329.

Figure 6:
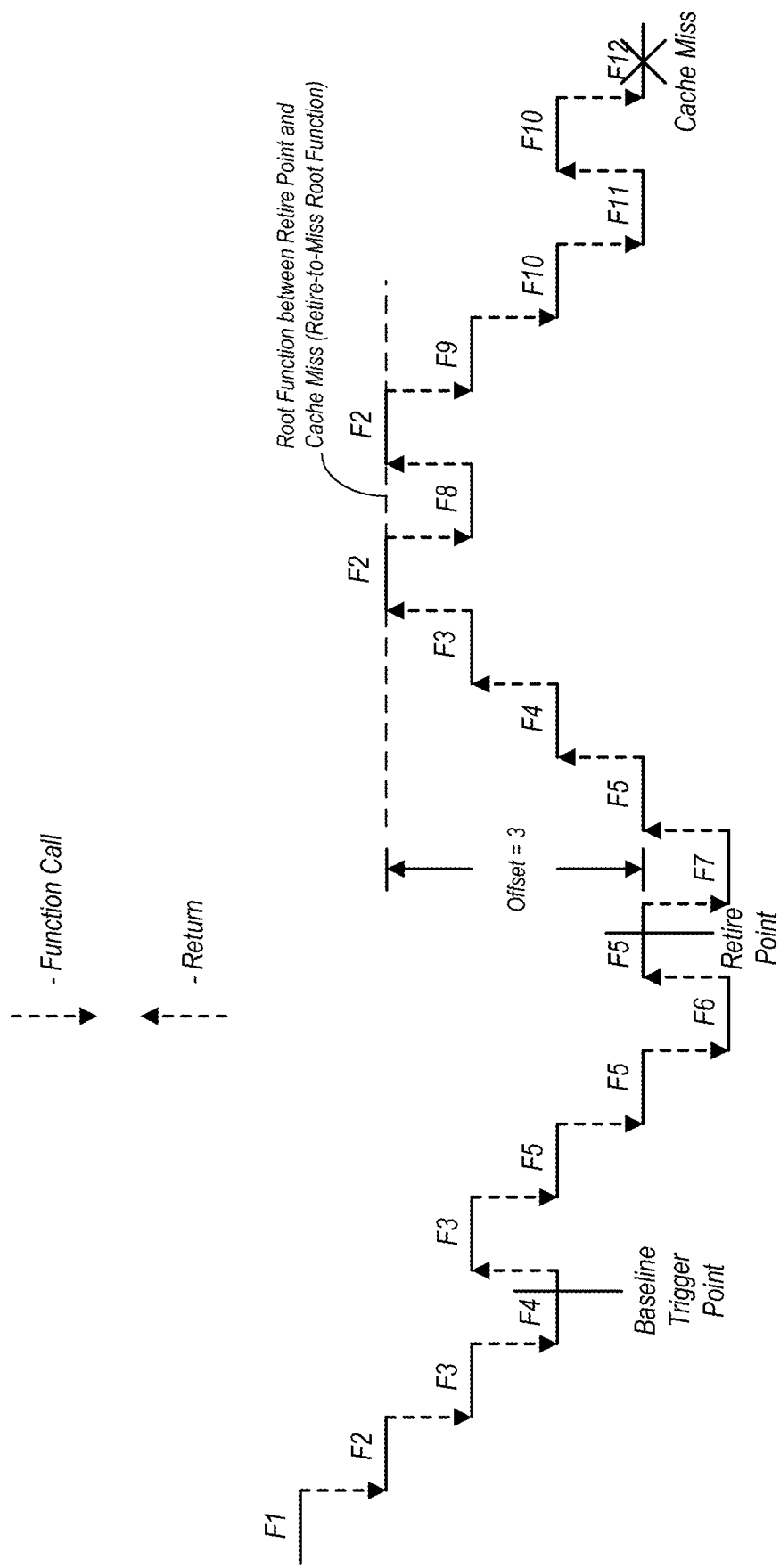
FIG. 6 is a diagram illustrating a root function in a sequence of function calls and returns between a retire point and a cache miss point as determined by one embodiment of a prefetch circuit.

FIG. 6 is a diagram illustrating a root function in a sequence of function calls and returns between a retire point and a cache miss point as determined by one embodiment of a prefetch circuit. In the example of FIG. 6, the sequence includes calls and returns of functions from F1 to F12. The retire point in this example occurs in F5. The retire-to-miss root function in this example is F2, since there are no predicted returns from this function between the retire point and the cache miss point. Thus, the program counter for F2 remains on the call stack for the duration of the sequence between the retire point and the cache miss point.

In this particular example, the baseline trigger point is in F4, and the baseline trigger-to-retire root function is F3, as its program counter is the deepest function that remains on the call stack for the entire duration between the baseline trigger point and the retire point in F5. However, since F2 remains on the call stack between the baseline trigger and retire points, and is also the retire-to-miss root function, comparator 328 of FIG. 3A would cause selector 339 to select the retire-to-miss root function depth, since its value is less than that of the trigger-to-retire root function depth and thus the corresponding root function remains on the call stack for the entirety of both the baseline-trigger-to-retire and the retire-to-miss intervals. In selecting a trigger point in this case, an instruction in F2 preceding the baseline trigger point could be chosen.

Figure 7:
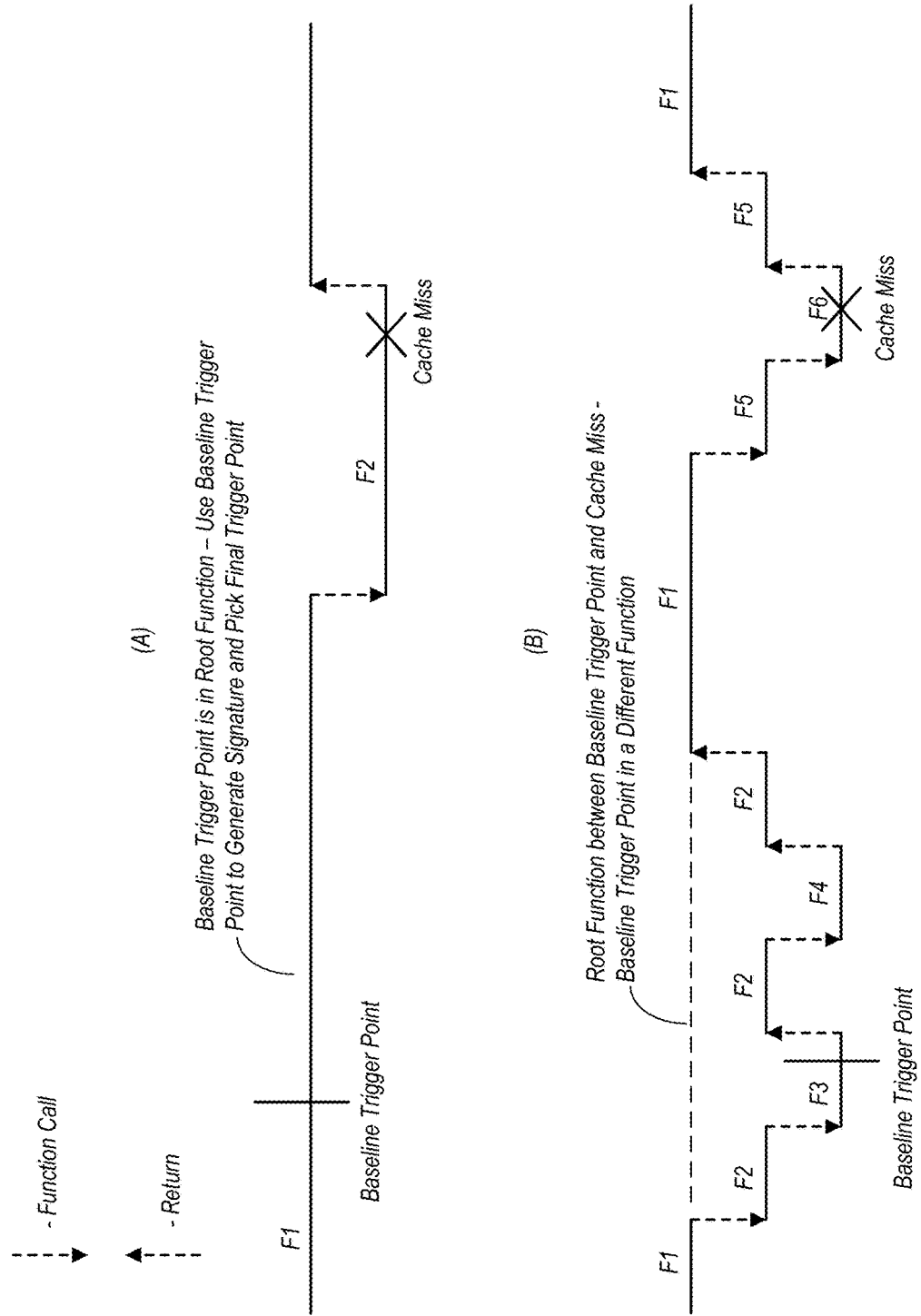
FIG. 7 is a diagram illustrating different sequences of function calls and returns in which the baseline trigger point is in the root function in a first sequence and in which the baseline trigger point is not in the root function in a second sequence, as determined by one embodiment of a prefetch circuit.

FIG. 7 is a diagram illustrating different sequences of function calls and returns in which the baseline trigger point is in the root function in a first sequence and in which the baseline trigger point is not in the root function in a second sequence, as determined by one embodiment of a prefetch circuit. In the example shown in (A), the root function is F1, which is the active function at the baseline trigger point and the only function that remains on the call stack between the baseline trigger point and the cache miss. Accordingly, the baseline trigger point falls within the root function. In this example, comparator circuit 343 of FIG. 3A would cause selector circuit 335 to select the input that is coupled to the output of delay queue 327 to provide the training signature.

In the contrasting example of (B), the root function in the interval between the baseline trigger point and the cache miss point is F1. Thus, for sequence (B), comparator circuit 343 of FIG. 3A would select the input coupled to the output of selector circuit 331 to cause a signature from signature stack 330 to be provided as the training signature.

Figure 8:
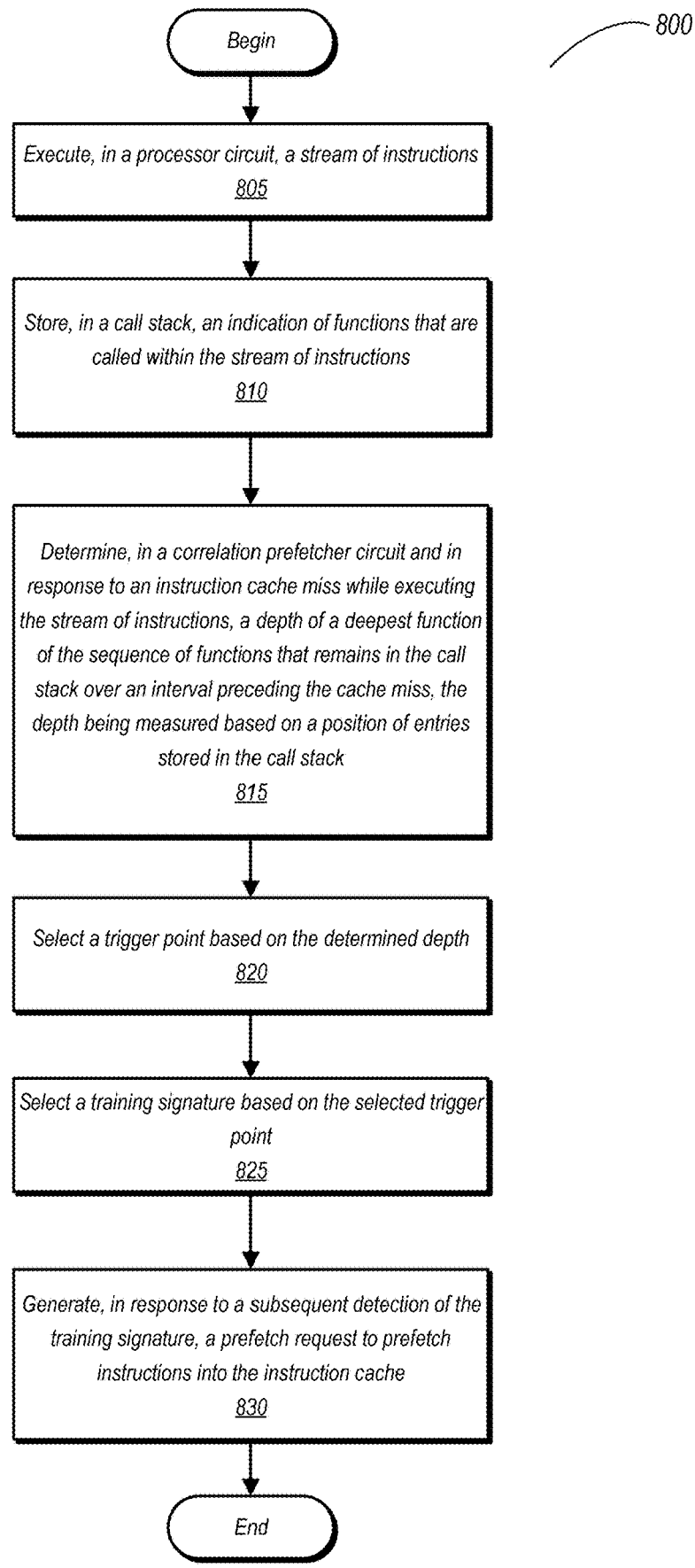
FIG. 8 is a flow diagram of one embodiment of a method for operating a prefetch circuit.

Methods of Operating:

FIG. 8 is a flow diagram of one embodiment of a method for operating a correlation prefetcher circuit according to the disclosure. Method 800 may be carried out by any of the various embodiments of a correlation prefetcher circuit as disclosed herein and discussed above. Embodiments of a correlation prefetcher circuit capable of carrying out the operations of method 800, but not otherwise explicitly discussed herein, are also considered to fall within the scope of this disclosure.

Method 800 includes executing, in a processor circuit, an instruction stream (block 805). The method further includes storing, in a call stack, an indication of functions that are called within the instruction stream (block 810). With regard to operation of a prefetcher, Method 800 includes determining, in a correlation prefetcher circuit and in response to detection of an instruction cache miss at a particular point in the instruction stream, a depth of a deepest function of the sequence of functions that remains in the call stack over an interval preceding the instruction cache miss, the depth being measured based on a position of entries stored in the call stack (block 815). Method 800 also includes selecting a trigger point based on the determined depth (block 820) and selecting a training signature based on the selected trigger point (block 825). Thereafter, the method includes generating, in response to subsequently detecting the training signature, a prefetch request to prefetch instructions into the instruction cache (block 830).

In various embodiments, the length of the interval is based on a refill time of the instruction cache (e.g., greater than or equal to a typical refill time). The method may also include determining, using the correlation prefetcher circuit, the depth of the deepest function based on a first function depth between a baseline trigger point and a retire point, a second function depth between the retire point and a cache miss point, and a third function depth at the baseline trigger point. Embodiments may also include storing, in a signature stack, training signature values corresponding to function calls, and removing training signature values corresponding to functions from which a return has been executed. In such embodiments, the method may also include selecting the training signature from the signature stack in response to determining that at least one of the first and second function depths is less than the third function depth. The method may further include selecting the training signature based on the baseline trigger point if neither the first nor second function depths are less than the third function depth.

Figure 9:
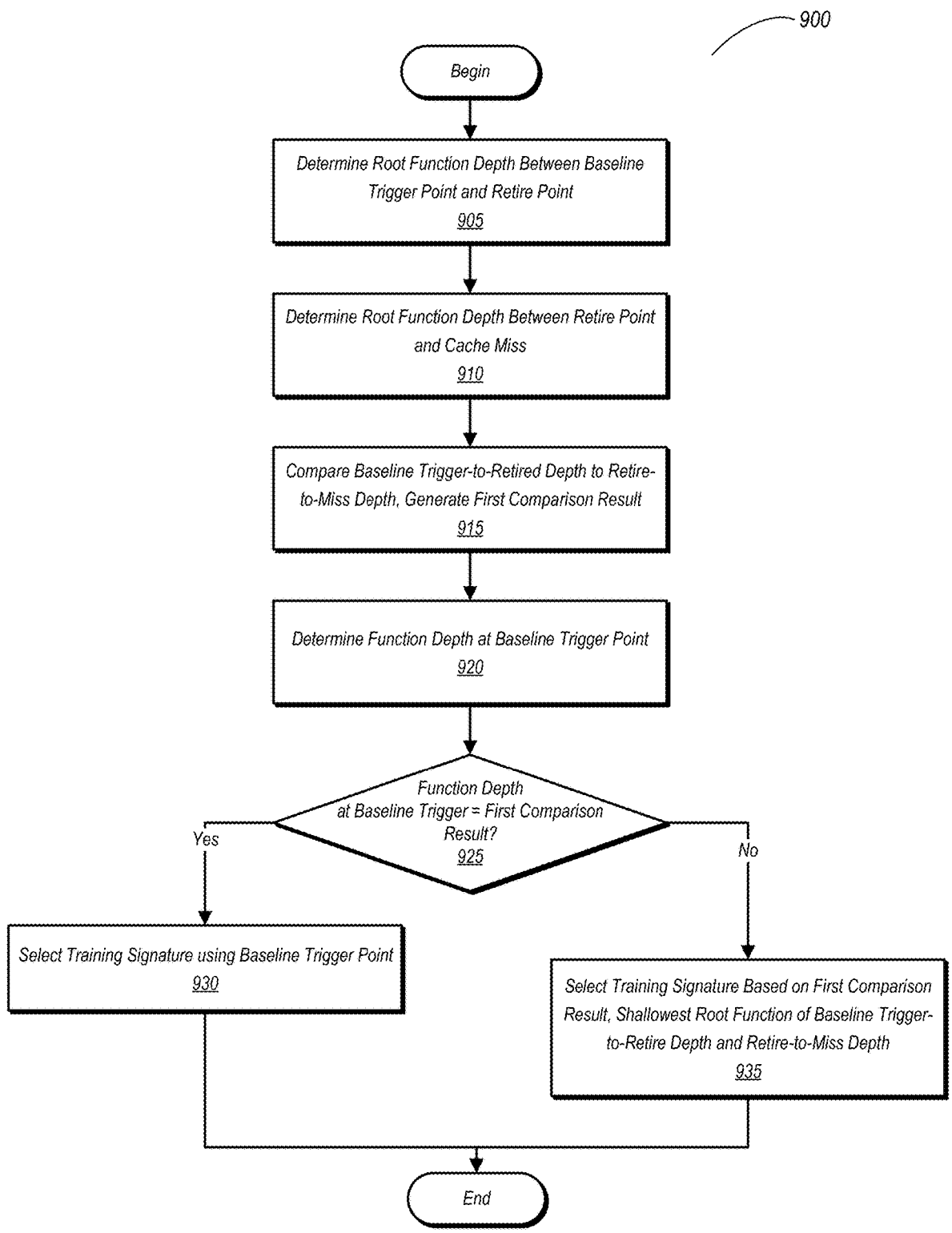
FIG. 9 is a flow diagram of one embodiment for using a prefetch circuit to determine a training signature.

FIG. 9 is a flow diagram illustrating one embodiment of a method for determining, based on a root function depth, a training signature usable by a correlation prefetcher circuit to trigger prefetches. Method 900 may be carried out by various embodiments of the prefetcher circuit disclosed herein. Embodiments of a prefetcher circuit capable of carrying out Method 900, but not otherwise disclosed herein, are considered to fall within the scope of this disclosure.

Method 900 includes determining a root function depth between a baseline trigger point and a retire point (block 905) in an instruction sequence that may include function calls and returns. The root function for this portion of Method 900 is the function having a program counter value that remains on the call stack for the entirety of the duration between the baseline trigger point and the retire point. The baseline trigger point is a point in an instruction stream that precedes the point where a cache miss previously occurred in the instruction stream. This point may be chosen such that a prefetch initiated at that point will typically allow sufficient time to refill the cache before the point in the instruction stream which the cache miss previously occurred such that another miss does not occur. The retire point is a point in the instruction stream between the baseline trigger point and the cache miss point before which any function calls or returns have been retired.

The method further includes determining a root function between the retire point and the cache miss point (block 910). After having determined both the baseline-to-retire root function and the retire-to-cache miss root function, the depths of these functions are compared to one another (block 915) to generate a first comparison result that selects the shallower of the two root functions. This comparison result determines the shallower of the two root functions. It is noted, however, that the two root functions may have the same depth in some instances, and thus the comparison result that is output indicates this depth. Method 900 also includes determining the function depth at the baseline trigger point (block 920).

After determining the first comparison result from block 915 and the function depth at the baseline trigger point (block 920), a second comparison is performed, namely between the first comparison result and the function depth of the baseline trigger point (block 925). If the function depth at the baseline trigger point is equal to the first comparison result (block 925, yes), the overall root function is the function in which the baseline trigger point occurs, and the training signature is selected using the baseline trigger point (block 930). If, on the other hand, the function depth at the baseline trigger point and the first comparison result are not equal (block 925, no), this indicates that the root function determined by the first comparison result. Accordingly, the training signature in this case is selected based on the root function of the baseline-to-retire root function and the retire-to-miss root function (block 935). In selecting the trigger point and generating the training signature, a function call to the root function that occurs prior to the baseline trigger point may be used, or alternatively, some point within the root function itself.

After selecting the training signature, the prefetcher circuit may store the signature in a detection circuit. The detection circuit may perform continual analysis of the instruction stream and, if the training signature is detected, trigger a prefetch to be carried out by the prefetcher circuit.

Figure 10:
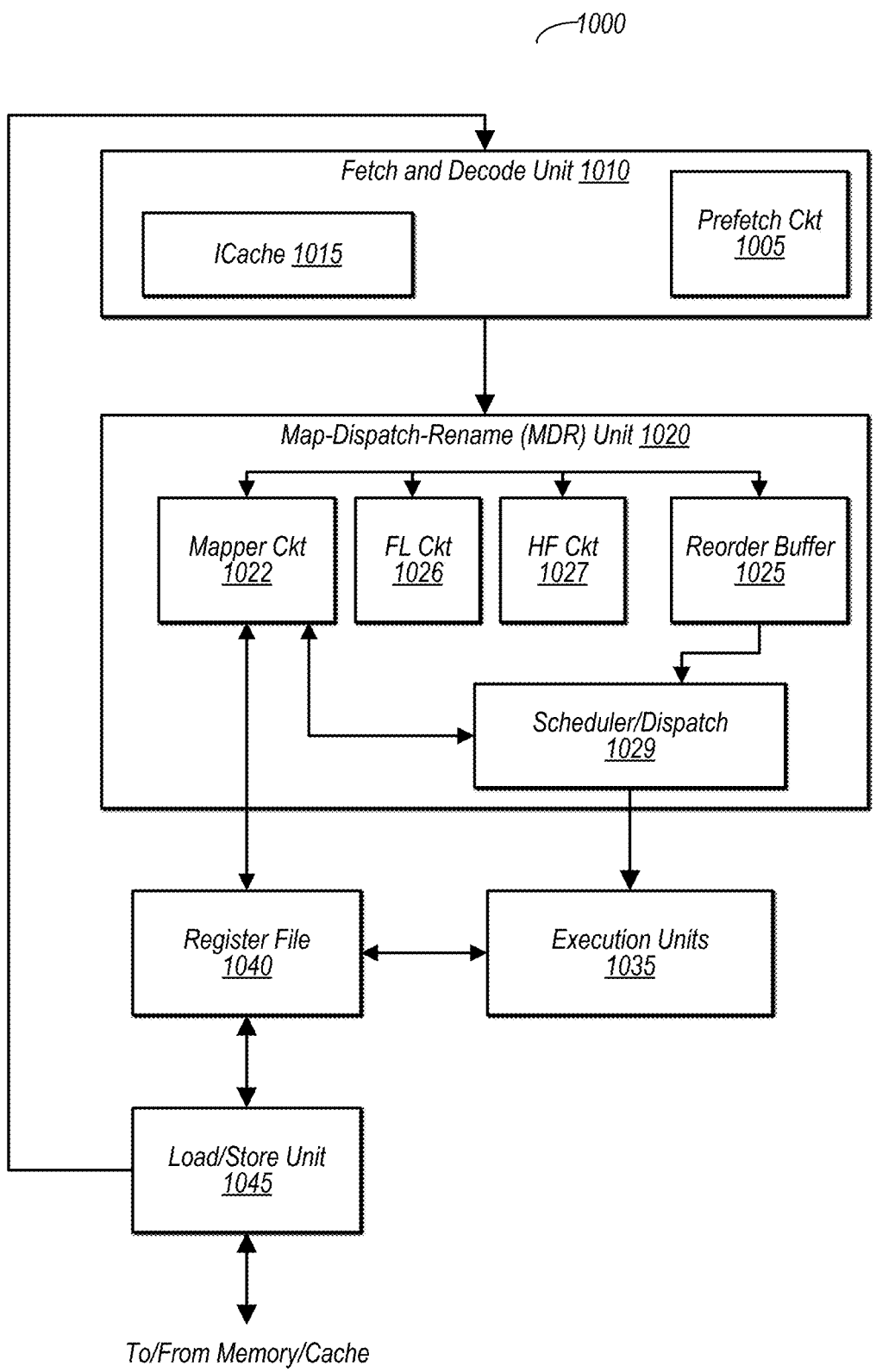
FIG. 10 is a block diagram of one embodiment of a processor circuit.

Processor Pipeline Embodiment:

FIG. 10 is a block diagram of one embodiment of a processor pipeline in which the correlation prefetch circuit of the present disclosure may be implemented. In the embodiment shown, processor pipeline 1000 includes a fetch and decode unit 1010 (which includes an instruction cache 1015 and a prefetch circuit 1005), a map-dispatch-rename (MDR) circuit 1020, a register file 1040, execution units 1035, and a load/store unit 1045. MDR circuit 1020 in the embodiment shown includes and prefetch circuit 1005, a mapper circuit 1022, a free list circuit 1026, a history file circuit 1027, a reorder buffer circuit 1025, and a scheduler/dispatch circuit 1029.

The fetching of instructions is carried out by the various circuits included in fetch and decode unit 1010. Some fetched instructions, such as those that are frequently used, may be stored in instruction cache 1015 subsequent to being fetched from memory. Fetch and decode unit 1015 may also include decode circuitry configured to decode fetched instructions. The decoding of an instruction may include determining the operation(s) to be carried out, source and destination registers (architected) to be used in execution of the instruction, and other information, such as indications of a conditional branch.

Some fetches of instructions carried out by fetch and decode unit 1010 are non-speculative. However, fetch and decode unit 1010 in the embodiment shown includes circuitry used to speculatively fetch instructions from a memory or a cache for subsequent execution. In various embodiments, fetch and decode unit 1010 includes one or more prefetchers configured to speculatively fetch instructions in accordance with this. Some speculative fetches may be carried out by prefetch circuit 1005, which may be a correlation prefetcher in one of the various embodiments discussed above. Prefetch circuit 1005 may dynamically select a trigger point based on a root function between a baseline trigger point and a miss point in which an access to instruction cache 1015 missed. In carrying out the dynamic selection of the trigger point, prefetch circuit 1005 uses code awareness of functional calls and returns to determine a deepest function that remains on a call stack for the entirety of the duration between a baseline trigger point and the point in the code where the cache miss previously occurred. Based on this determination, a training signature corresponding to the selected trigger point is generated. A subsequent encounter of the training signature in an instruction sequence triggers a prefetch to be carried out by prefetch circuit 1005.

Mapper circuit 1022 of MDR unit 1020 may map certain physical registers in register file 1040 to architected registers that are used as a source and/or a destination by various instructions to be executed. In determining which physical registers to use, mapper circuit 1022 may access a free list stored in free list circuit 1026 to determine availability of the various physical registers. Mapper circuit 1022 may also place information corresponding to physical registers used in executed instructions into history file 1027, where the information may remain until the corresponding instructions and any dependent instructions have been retired.

Reorder buffer circuit 1025 may group instructions into reorder buffer groups, and may also perform reordering of instructions to enable out-of-order execution when permitted. For example, an instruction that is a last instruction of a particular reorder buffer group, but has no dependency on any other instruction in the group, may be reordered to execute first. The enabling of out-of-order execution may allow more efficient use of processor pipeline 1000 by helping to keep pipeline stages full. Reorder buffer circuit 1025 may also ensure that results of instructions of a particular reorder buffer group are committed to architected registers and those instructions retired in the intended program order.

Scheduler/dispatch circuit 1029 may schedule instructions for execution, and may also dispatch instructions to the execution units 1035. In scheduling instructions for execution, scheduler/dispatch circuit 1029 may receive information, from reorder buffer circuit 1025, indicative of the actual order in which instructions are to be executed within a particular reorder buffer group. Furthermore, scheduler/dispatch circuit 1029 may also provide information regarding scheduled instructions to mapper circuit 1022 in order to enable physical registers of register 1040 to be scheduled for renaming as architected registers associated with the instructions. Mapper circuit 1022 may provide information corresponding to renamed physical registers back to scheduler/dispatch circuit 1022 in order to enable execution circuits in execution units 1035 to find any required source data as well as find destination registers in which to write results.

Execution units 1035 may comprise various execution circuits that execute instructions received from scheduler/dispatch circuit 1029. The various types of execution circuits may include one or more integer value execution circuits, one or more fixed point execution circuits, and one or more floating point execution circuits. Other types of execution circuits are also possible and contemplated. In executing instructions, the various execution circuits may access register file 1040 to obtain any required source data/operands there from, using information generated by mapper circuit 1022 regarding which physical registers are mapped to architected register. The various execution circuits may also write results of executed instructions to physical registers mapped as destination architected registers per the register renaming carried out by mapper circuit 1022.

Load/store unit 1045 in the embodiment shown comprises at least one additional execution circuit that is specialized for memory accesses. These operations include carrying out loads, in which instructions and/or data is loaded from another storage in a memory hierarchy that may include multiple levels of cache memory, a main system memory, and bulk storage. Stores carried out by load/store unit 1045 may store information back to main system memory, and may also include storing the data to one or more levels of cache memory, as well as to bulk storage.

Figure 11:
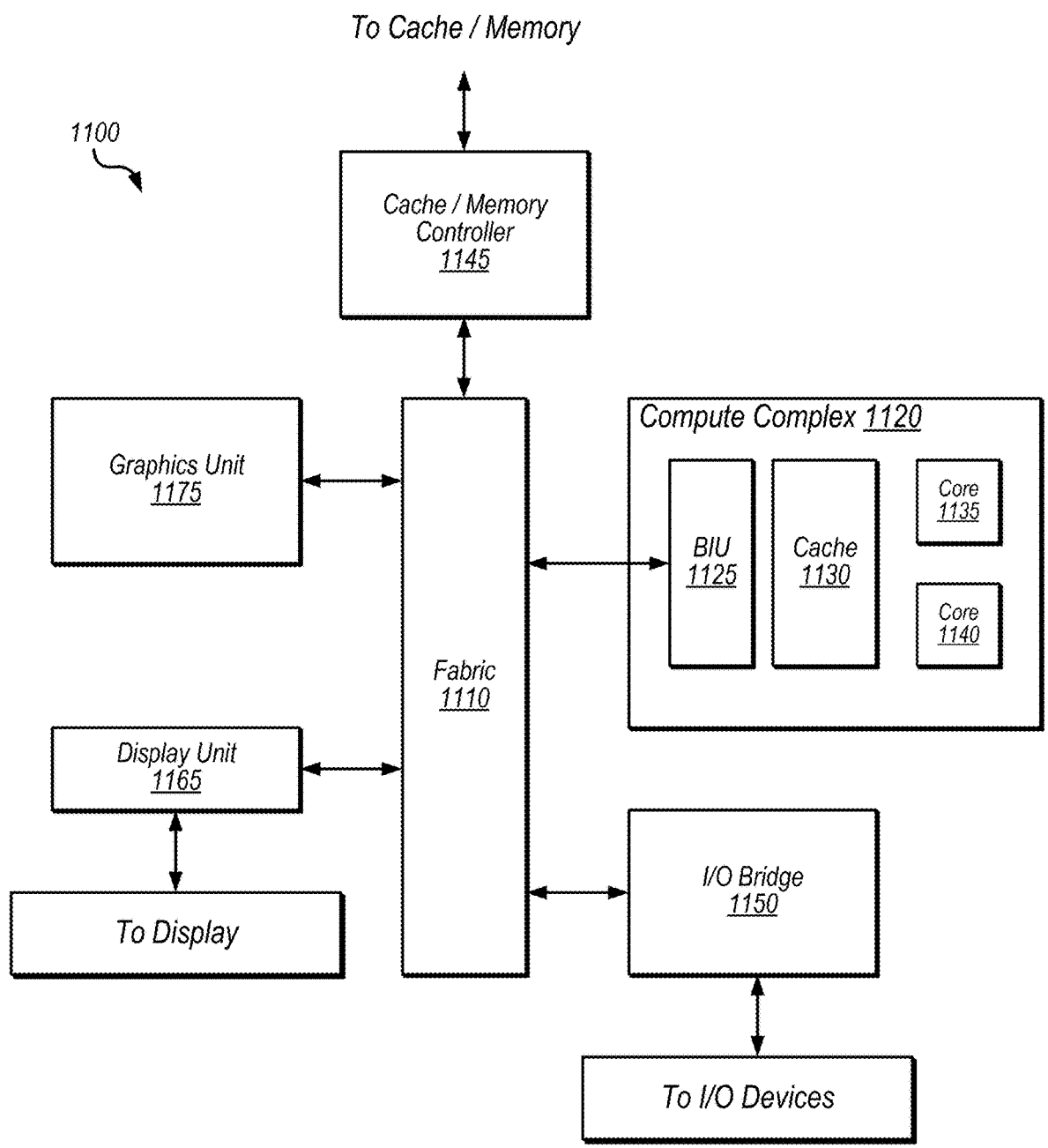
FIG. 11 is a block diagram of one embodiment of a device.

Example Device:

Referring now to FIG. 11, a block diagram illustrating an example embodiment of a device 1100 is shown. In some embodiments, elements of device 1100 may be included within a system on a chip. In some embodiments, device 1100 may be included in a mobile device, which may be battery-powered. Therefore, power consumption by device 1100 may be an important design consideration. In the illustrated embodiment, device 1100 includes fabric 1110, compute complex 1120 input/output (I/O) bridge 1150, cache/memory controller 1145, graphics unit 1175, and display unit 1165. In some embodiments, device 1100 may include other components (not shown) in addition to or in place of the illustrated components, such as video processor encoders and decoders, image processing or recognition elements, computer vision elements, etc.

Fabric 1110 may include various interconnects, buses, MUX's, controllers, etc., and may be configured to facilitate communication between various elements of device 1100. In some embodiments, portions of fabric 1110 may be configured to implement various different communication protocols. In other embodiments, fabric 1110 may implement a single communication protocol and elements coupled to fabric 1110 may convert from the single communication protocol to other communication protocols internally.

In the illustrated embodiment, compute complex 1120 includes bus interface unit (BIU) 1125, cache 1130, and cores 1135 and 1140. In various embodiments, compute complex 1120 may include various numbers of processors, processor cores and caches. For example, compute complex 1120 may include 1, 2, or 4 processor cores, or any other suitable number. One or more of the processor cores may include a correlation prefetcher circuit in accordance with the discussion above. In one embodiment, cache 1130 is a set associative L2 cache. In some embodiments, cores 1135 and 1140 may include internal instruction and data caches. In some embodiments, a coherency unit (not shown) in fabric 1110, cache 1130, or elsewhere in device 1100 may be configured to maintain coherency between various caches of device 1100. BIU 1125 may be configured to manage communication between compute complex 1120 and other elements of device 1100.

Processor cores such as cores 1135 and 1140 may be configured to execute instructions of a particular instruction set architecture (ISA) which may include operating system instructions and user application instructions. These instructions may be stored in computer readable medium such as a memory coupled to memory controller 1145 discussed below.

As used herein, the term "coupled to" may indicate one or more connections between elements, and a coupling may include intervening elements. For example, in FIG. 11, graphics unit 1175 may be described as "coupled to" a memory through fabric 1110 and cache/memory controller 1145. In contrast, in the illustrated embodiment of FIG. 11, graphics unit 1175 is "directly coupled" to fabric 1110 because there are no intervening elements.

Cache/memory controller 1145 may be configured to manage transfer of data between fabric 1110 and one or more caches and memories. For example, cache/memory controller 1145 may be coupled to an L3 cache, which may in turn be coupled to a system memory. In other embodiments, cache/memory controller 1145 may be directly coupled to a memory. In some embodiments, cache/memory controller 1145 may include one or more internal caches. Memory coupled to controller 1145 may be any type of volatile memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR4, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices may be mounted with an integrated circuit in a chip-on-chip configuration, a package-on-package configuration, or a multi-chip module configuration. Memory coupled to controller 1145 may be any type of non-volatile memory such as NAND flash memory, NOR flash memory, nano RAM (NRAM), magneto-resistive RAM (MRAM), phase change RAM (PRAM), Racetrack memory, Memristor memory, etc. As noted above, this memory may store program instructions executable by compute complex 1120 to cause the computing device to perform functionality described herein.

Graphics unit 1175 may include one or more processors, e.g., one or more graphics processing units (GPUs). Graphics unit 1175 may receive graphics-oriented instructions, such as OPENGL®, Metal®, or DIRECT3D® instructions, for example. Graphics unit 1175 may execute specialized GPU instructions or perform other operations based on the received graphics-oriented instructions. Graphics unit 1175 may generally be configured to process large blocks of data in parallel and may build images in a frame buffer for output to a display, which may be included in the device or may be a separate device. Graphics unit 1175 may include transform, lighting, triangle, and rendering engines in one or more graphics processing pipelines. Graphics unit 1175 may output pixel information for display images. Graphics unit 1175, in various embodiments, may include programmable shader circuitry which may include highly parallel execution cores configured to execute graphics programs, which may include pixel tasks, vertex tasks, and compute tasks (which may or may not be graphics-related).

Display unit 1165 may be configured to read data from a frame buffer and provide a stream of pixel values for display. Display unit 1165 may be configured as a display pipeline in some embodiments. Additionally, display unit 1165 may be configured to blend multiple frames to produce an output frame. Further, display unit 1165 may include one or more interfaces (e.g., MIPI® or embedded display port (eDP)) for coupling to a user display (e.g., a touchscreen or an external display).

I/O bridge 1150 may include various elements configured to implement: universal serial bus (USB) communications, security, audio, and low-power always-on functionality, for example. I/O bridge 1150 may also include interfaces such as pulse-width modulation (PWM), general-purpose input/output (GPIO), serial peripheral interface (SPI), and interintegrated circuit (I2C), for example. Various types of peripherals and devices may be coupled to device 1100 via I/O bridge 1150.

In some embodiments, device 1100 includes network interface circuitry (not explicitly shown), which may be connected to fabric 1110 or I/O bridge 1150. The network interface circuitry may be configured to communicate via various networks, which may be wired, wireless, or both. For example, the network interface circuitry may be configured to communicate via a wired local area network, a wireless local area network (e.g., via Wi-Fi™), or a wide area network (e.g., the Internet or a virtual private network). In some embodiments, the network interface circuitry is configured to communicate via one or more cellular networks that use one or more radio access technologies. In some embodiments, the network interface circuitry is configured to communicate using device-to-device communications (e.g., Bluetooth® or Wi-Fi™ Direct), etc. In various embodiments, the network interface circuitry may provide device 1100 with connectivity to various types of other devices and networks.

Example Applications

Figure 12:
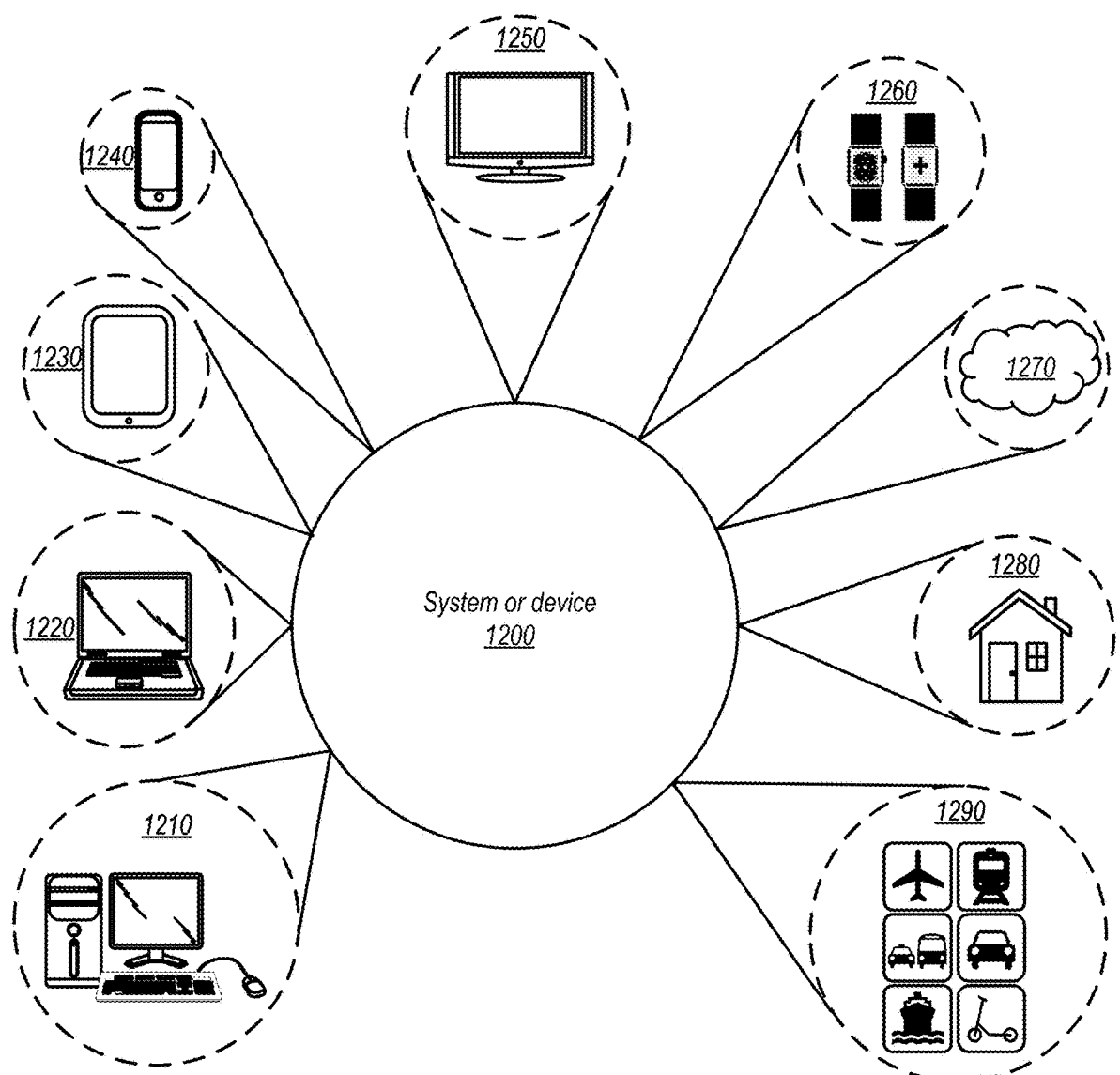
FIG. 12 is a diagram illustrating possible applications for one embodiment of a device according to the disclosure.

Turning now to FIG. 12, various types of systems that may include any of the circuits, devices, or system discussed above. System or device 1200, which may incorporate or otherwise utilize one or more of the techniques described herein, may be utilized in a wide range of areas. For example, system or device 1200 may be utilized as part of the hardware of systems such as a desktop computer 1210, laptop computer 1220, tablet computer 1230, cellular or mobile phone 1240, or television 1250 (or set-top box coupled to a television).

Similarly, disclosed elements may be utilized in a wearable device 1260, such as a smartwatch or a health-monitoring device. Smartwatches, in many embodiments, may implement a variety of different functions—for example, access to email, cellular service, calendar, health monitoring, etc. A wearable device may also be designed solely to perform health-monitoring functions, such as monitoring a user's vital signs, performing epidemiological functions such as contact tracing, providing communication to an emergency medical service, etc. Other types of devices are also contemplated, including devices worn on the neck, devices implantable in the human body, glasses or a helmet designed to provide computer-generated reality experiences such as those based on augmented and/or virtual reality, etc.

System or device 1200 may also be used in various other contexts. For example, system or device 1200 may be utilized in the context of a server computer system, such as a dedicated server or on shared hardware that implements a cloud-based service 1270. Still further, system or device 1200 may be implemented in a wide range of specialized everyday devices, including devices 1280 commonly found in the home such as refrigerators, thermostats, security cameras, etc. The interconnection of such devices is often referred to as the "Internet of Things" (IoT). Elements may also be implemented in various modes of transportation. For example, system or device 1200 could be employed in the control systems, guidance systems, entertainment systems, etc. of various types of vehicles 1290.

The applications illustrated in FIG. 12 are merely exemplary and are not intended to limit the potential future applications of disclosed systems or devices. Other example applications include, without limitation: portable gaming devices, music players, data storage devices, unmanned aerial vehicles, etc.

Various ones of the applications discussed herein may include one or more integrated circuits having implemented therein a processor or processor core that includes a prefetcher circuit as discussed above. Such prefetcher circuits may carry out prefetch operations based on a dynamically determined trigger point that is based on a root function between two selected points of the instruction stream.

Example Computer-Readable Medium:

The present disclosure has described various example circuits in detail above. It is intended that the present disclosure cover not only embodiments that include such circuitry, but also a computer-readable storage medium that includes design information that specifies such circuitry. Accordingly, the present disclosure is intended to support claims that cover not only an apparatus that includes the disclosed circuitry, but also a storage medium that specifies the circuitry in a format that programs a computing system to generate a simulation model of the hardware circuit, programs a fabrication system configured to produce hardware (e.g., an integrated circuit) that includes the disclosed circuitry, etc. Claims to such a storage medium are intended to cover, for example, an entity that produces a circuit design, but does not itself perform complete operations such as: design simulation, design synthesis, circuit fabrication, etc.

Figure 13:
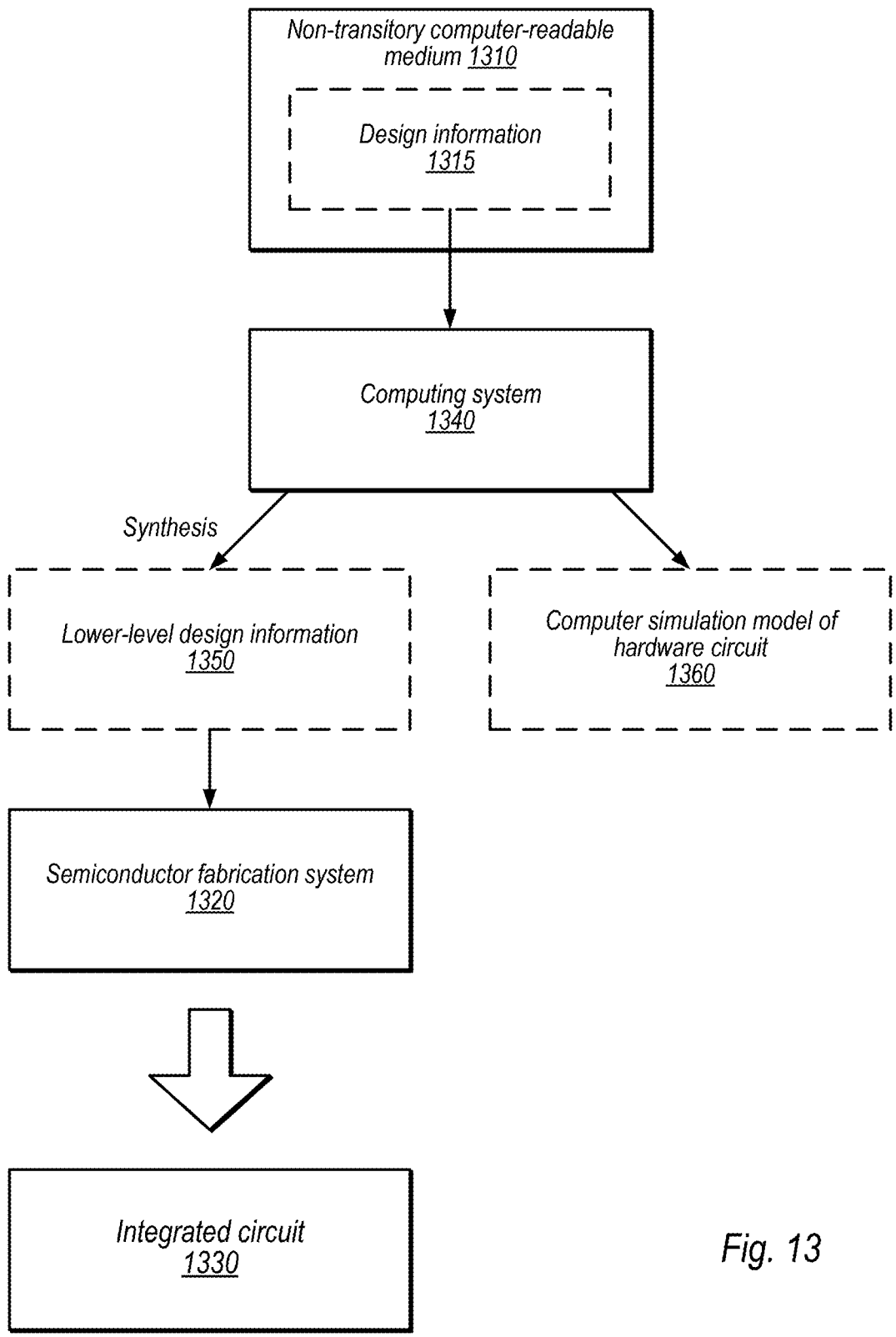
FIG. 13 is a block diagram illustrating one embodiment of a computer readable medium usable for manufacturing a circuit according to the disclosure.

FIG. 13 is a block diagram illustrating an example non-transitory computer-readable storage medium that stores circuit design information, according to some embodiments. In the illustrated embodiment, computing system 1340 is configured to process the design information. This may include executing instructions included in the design information, interpreting instructions included in the design information, compiling, transforming, or otherwise updating the design information, etc. Therefore, the design information controls computing system 1340 (e.g., by programming computing system 1340) to perform various operations discussed below, in some embodiments.

In the illustrated example, computing system 1340 processes the design information to generate both a computer simulation model of a hardware circuit 1360 and lower-level design information 1350. In other embodiments, computing system 1340 may generate only one of these outputs, may generate other outputs based on the design information, or both. Regarding the computing simulation, computing system 1340 may execute instructions of a hardware description language that includes register transfer level (RTL) code, behavioral code, structural code, or some combination thereof. The simulation model may perform the functionality specified by the design information, facilitate verification of the functional correctness of the hardware design, generate power consumption estimates, generate timing estimates, etc.

In the illustrated example, computing system 1340 also processes the design information to generate lower-level design information 1350 (e.g., gate-level design information, a netlist, etc.). This may include synthesis operations, as shown, such as constructing a multi-level network, optimizing the network using technology-independent techniques, technology dependent techniques, or both, and outputting a network of gates (with potential constraints based on available gates in a technology library, sizing, delay, power, etc.). Based on lower-level design information 1350 (potentially among other inputs), semiconductor fabrication system 1320 is configured to fabricate an integrated circuit 1330 (which may correspond to functionality of the simulation model 1360). Note that computing system 1340 may generate different simulation models based on design information at various levels of description, including information 1350, 1315, and so on. The data representing design information 1350 and model 1360 may be stored on medium 1310 or on one or more other media.

In some embodiments, the lower-level design information 1350 controls (e.g., programs) the semiconductor fabrication system 1320 to fabricate the integrated circuit 1330. Thus, when processed by the fabrication system, the design information may program the fabrication system to fabricate a circuit that includes various circuitry disclosed herein.

Non-transitory computer-readable storage medium 1310, may comprise any of various appropriate types of memory devices or storage devices. Non-transitory computer-readable storage medium 1310 may be an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. Non-transitory computer-readable storage medium 1310 may include other types of non-transitory memory as well or combinations thereof. Accordingly, non-transitory computer-readable storage medium 1310 may include two or more memory media; such media may reside in different locations—for example, in different computer systems that are connected over a network.

Design information 1315 may be specified using any of various appropriate computer languages, including hardware description languages such as, without limitation: VHDL, Verilog, SystemC, System Verilog, RHDL, M, MyHDL, etc. The format of various design information may be recognized by one or more applications executed by computing system 1340, semiconductor fabrication system 1320, or both. In some embodiments, design information may also include one or more cell libraries that specify the synthesis, layout, or both of integrated circuit 1330. In some embodiments, the design information is specified in whole or in part in the form of a netlist that specifies cell library elements and their connectivity. Design information discussed herein, taken alone, may or may not include sufficient information for fabrication of a corresponding integrated circuit. For example, design information may specify the circuit elements to be fabricated but not their physical layout. In this case, design information may be combined with layout information to actually fabricate the specified circuitry.

Integrated circuit 1330 may, in various embodiments, include one or more custom macrocells, such as memories, analog or mixed-signal circuits, and the like. In such cases, design information may include information related to included macrocells. Such information may include, without limitation, schematics capture database, mask design data, behavioral models, and device or transistor level netlists. Mask design data may be formatted according to graphic data system (GDSII), or any other suitable format.

Semiconductor fabrication system 1320 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 1320 may also be configured to perform various testing of fabricated circuits for correct operation.

In various embodiments, integrated circuit 1330 and model 1360 are configured to operate according to a circuit design specified by design information 1315, which may include performing any of the functionality described herein. For example, integrated circuit 1330 may include any of various elements shown in FIGS. 1, 3A, 3B, 10, and 11. Further, integrated circuit 1330 may be configured to perform various functions described herein in conjunction with other components. Further, the functionality described herein may be performed by multiple connected integrated circuits.

As used herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components. Similarly, stating "instructions of a hardware description programming language" that are "executable" to program a computing system to generate a computer simulation model" does not imply that the instructions must be executed in order for the element to be met, but rather specifies characteristics of the instructions. Additional features relating to the model (or the circuit represented by the model) may similarly relate to characteristics of the instructions, in this context. Therefore, an entity that sells a computer-readable medium with instructions that satisfy recited characteristics may provide an infringing product, even if another entity actually executes the instructions on the medium.

Note that a given design, at least in the digital logic context, may be implemented using a multitude of different gate arrangements, circuit technologies, etc. As one example, different designs may select or connect gates based on design tradeoffs (e.g., to focus on power consumption, performance, circuit area, etc.). Further, different manufacturers may have proprietary libraries, gate designs, physical gate implementations, etc. Different entities may also use different tools to process design information at various layers (e.g., from behavioral specifications to physical layout of gates).

Once a digital logic design is specified, however, those skilled in the art need not perform substantial experimentation or research to determine those implementations. Rather, those of skill in the art understand procedures to reliably and predictably produce one or more circuit implementations that provide the function described by the design information. The different circuit implementations may affect the performance, area, power consumption, etc. of a given design (potentially with tradeoffs between different design goals), but the logical function does not vary among the different circuit implementations of the same circuit design.

In some embodiments, the instructions included in the design information instructions provide RTL information (or other higher-level design information) and are executable by the computing system to synthesize a gate-level netlist that represents the hardware circuit based on the RTL information as an input. Similarly, the instructions may provide behavioral information and be executable by the computing system to synthesize a netlist or other lower-level design information. The lower-level design information may program fabrication system 1320 to fabricate integrated circuit 1330.

The present disclosure includes references to "an embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent claims that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some tasks even if the structure is not currently being operated. Thus, an entity described or recited as being "configured to" perform some tasks refers to something physical, such as a device, circuit, a system having a processor unit and a memory storing program instructions executable to implement the task, etc. This phrase is not used herein to refer to something intangible.

In some cases, various units/circuits/components may be described herein as performing a set of tasks or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements may be defined by the functions or operations that they are configured to implement. The arrangement and such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used to transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g. passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

Numerous variations and modifications will become apparent to those skilled in the art once the above disclosure is fully appreciated. It is intended that the following claims be interpreted to embrace all such variations and modifications.

What is claimed is:

1. An apparatus, comprising:
 a processor circuit configured to execute an instruction stream, the processor circuit including:
  an instruction cache;
  a call stack having entries configured to store an indication of functions that are called within the instruction stream; and
  a correlation prefetcher circuit configured to:
   in response to detection of an instruction cache miss at a particular point in the instruction stream, determine a depth of a deepest function, of a sequence of functions, that remains in the call stack over an interval preceding the instruction cache miss, the depth being measured based on a position of entries stored in the call stack;
   select a trigger point based on the determined depth;
   select a training signature based on the selected trigger point; and
   in response to subsequently detecting the training signature, generate a prefetch request to prefetch instructions into the instruction cache.

2. The apparatus of claim 1, wherein a length of the interval is based on a refill time of the instruction cache.

3. The apparatus of claim 1, wherein the correlation prefetcher circuit is configured to determine the depth based on a first function depth between a baseline trigger point and a retire point, a second function depth between the retire point and a cache miss point, and further configured to determine a third function depth at the baseline trigger point.

4. The apparatus of claim 3, wherein the correlation prefetcher circuit includes a signature stack configured to store training signature values corresponding to function calls and further configured to remove training signature values in response to returns executed by their corresponding functions.

5. The apparatus of claim 4, wherein the correlation prefetcher circuit is configured to select the training signature from the signature stack in response to determining that at least one of the first and second function depths is less than the third function depth.

6. The apparatus of claim 3, wherein the correlation prefetcher circuit is configured to select the training signature based on the baseline trigger point if the baseline trigger point falls within the deepest function, of the sequence of functions, that remains in the call stack over the interval preceding the instruction cache miss between the baseline trigger point and the cache miss point.

7. The apparatus of claim 3, wherein the correlation prefetcher circuit includes a delay queue having a plurality of entries and is implemented as a first-in, first-out structure, wherein the delay queue is configured to store program counter values for retired branch instructions, the branch instructions including retired function calls and retired function returns.

8. The apparatus of claim 7, wherein the correlation prefetcher circuit is configured to determine the first function depth based on a minimum function depth of the plurality of entries in the delay queue.

9. The apparatus of claim 7, wherein a number of entries of the plurality of entries is based on a refill time of the instruction cache.

10. The apparatus of claim 7, wherein the correlation prefetcher circuit further comprises:
 a retire depth tracker circuit configured to store a value indicative, at a given time, of a number of retired function calls and retired function returns; and
 a return address stack configured to store information correlating retired function calls with corresponding speculative function returns; and
 a difference circuit configured to determine the second function depth based on retired depth, a number of retired function calls, and a number of speculative function calls.

11. The apparatus of claim 7, further comprising a baseline trigger point depth tracker coupled to an output of the delay queue and configured to determine the third function depth based on a number or retired function calls and retired function returns at the baseline trigger point.

12. A method comprising:
 executing, in a processor circuit, an instruction stream;
 storing, in a call stack, an indication of functions that are called within the instruction stream;
 determining, in a correlation prefetcher circuit and in response to detection of an instruction cache miss at a particular point in the instruction stream, a depth of a deepest function, of a sequence of functions, that remains in the call stack over an interval preceding the instruction cache miss, the depth being measured based on a position of entries stored in the call stack;
 selecting a trigger point based on the determined depth;
 selecting a training signature based on the selected trigger point; and
 generating, in response to subsequently detecting the training signature, a prefetch request to prefetch instructions into the instruction cache.

13. The method of claim 12, wherein a length of the interval is based on a refill time of the instruction cache.

14. The method of claim 12, further comprising determining, using the correlation prefetcher circuit, a first function depth between a baseline trigger point and a retire point, a second function depth between the retire point and a cache miss point, and a third function depth at the baseline trigger point.

15. The method of claim 14, further comprising:
storing, in a signature stack, training signature values corresponding to function calls;
removing, from the signature stack, a training signature value corresponding to a function from which a return has been executed.

16. The method of claim 15, further comprising selecting the training signature from the signature stack in response to determining that at least one of the first and second function depths is less than the third function depth.

17. The method of claim 14, further comprising selecting the training signature based on the baseline trigger point if the baseline trigger point falls within the deepest function, of the sequence of functions, that remains in the call stack over the interval preceding the instruction cache miss between the baseline trigger point and the cache miss point.

18. A system comprising:
a processor circuit configured to execute an instruction stream, the processor circuit including:
an instruction cache;
a call stack having entries configured to store an indication of functions that are called within the instruction stream; and
a correlation prefetcher circuit configured to, in response to detection of an instruction cache miss at a particular point in the instruction stream, determine a depth of a deepest function, of a sequence of functions, that remains in the call stack over an interval preceding the instruction cache miss, wherein the correlation prefetcher circuit includes circuitry configured to determine the deepest function based on:
a first function depth in the instruction stream between a baseline trigger point and a retire point;
a second function depth in the instruction stream between the retire point and a point of the instruction cache miss; and
a third function depth in the instruction stream at the baseline trigger point;
wherein the correlation prefetcher circuit is further configured to:
select a trigger point based on the determined depth;
select a training signature based on the selected trigger point; and
in response to subsequently detecting the training signature, generate a prefetch request to prefetch instructions into the instruction cache.

19. The system of claim 18, wherein the correlation prefetcher circuit includes a delay queue having a plurality of entries and is implemented as a first-in, first-out structure, wherein the delay queue is configured to store program counter values for retired branch instructions, the branch instructions including retired function calls and retired function returns, wherein a number of the plurality of entries corresponds to a length of the interval, and wherein the length of the interval is based on a refill time of the instruction cache.

20. The system of claim 18, wherein the correlation prefetcher circuit includes a signature stack configured to store training signature values corresponding to function calls, wherein the signature stack is configured to evict a particular training signature in response to a return of its corresponding function.

* * * * *